United States Patent
Ohno et al.

(10) Patent No.: US 9,900,175 B2
(45) Date of Patent: Feb. 20, 2018

(54) DISPLAY APPARATUS, DISPLAY METHOD, AND DISPLAY PROGRAM

(71) Applicant: NEC CORPORATION, Tokyo (JP)

(72) Inventors: Takeo Ohno, Tokyo (JP); Kentaro Sonoda, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 383 days.

(21) Appl. No.: 13/689,169

(22) Filed: Nov. 29, 2012

(65) Prior Publication Data

US 2013/0275876 A1  Oct. 17, 2013

(30) Foreign Application Priority Data

Apr. 13, 2012  (JP) .................................. 2012-92182

(51) Int. Cl.
| | |
|---|---|
| H04L 12/28 | (2006.01) |
| G06F 3/0481 | (2013.01) |
| H04L 12/24 | (2006.01) |
| H04L 12/26 | (2006.01) |
| H04L 12/46 | (2006.01) |

(52) U.S. Cl.
CPC ...... *H04L 12/2809* (2013.01); *G06F 3/04817* (2013.01); *H04L 12/4641* (2013.01); *H04L 41/22* (2013.01); *H04L 43/0811* (2013.01)

(58) Field of Classification Search
CPC ............................ H04L 41/12; H04L 12/2809
USPC ....................................................... 715/736
See application file for complete search history.

(56) References Cited

U.S. PATENT DOCUMENTS

| | | | | |
|---|---|---|---|---|
| 5,910,803 A | * | 6/1999 | Grau et al. | 715/734 |
| 6,608,635 B1 | * | 8/2003 | Mumm | 715/736 |
| 6,885,387 B1 | * | 4/2005 | Machida | 715/736 |
| 7,246,178 B2 | * | 7/2007 | Roberts et al. | 709/249 |
| 7,716,585 B2 | * | 5/2010 | Glass | 715/734 |
| 8,484,332 B2 | * | 7/2013 | Bush et al. | 709/223 |
| 8,671,176 B1 | * | 3/2014 | Kharitonov et al. | 709/223 |
| 2003/0046390 A1 | * | 3/2003 | Ball et al. | 709/224 |
| 2003/0212776 A1 | * | 11/2003 | Roberts et al. | 709/223 |

(Continued)

FOREIGN PATENT DOCUMENTS

| | | | |
|---|---|---|---|
| JP | 11345222 | A | 12/1999 |
| JP | 3896310 | B2 | 3/2007 |
| JP | 2011-517346 | A | 6/2011 |

OTHER PUBLICATIONS

Communication dated Oct. 18, 2016, from the Japanese Patent Office in counterpart application No. 2012-092182.

*Primary Examiner* — William Bashore
*Assistant Examiner* — Nathan Shrewsbury
(74) *Attorney, Agent, or Firm* — Sughrue Mion, PLLC

(57) ABSTRACT

A display apparatus according to an exemplary aspect of the invention includes a display unit which displays information on a system, which includes a plurality of system resources and one or more than one networks connecting the system resources, on a screen of a display device, wherein the display unit displays system resource identifiers which identify the system resources respectively, and network identifiers which identify the networks respectively, and furthermore displays a state of connection between the system resource and the network at an area determined on the basis of the displayed system resource identifier and the displayed network identifier, on the screen.

33 Claims, 21 Drawing Sheets

(56) References Cited

U.S. PATENT DOCUMENTS

| | | | |
|---|---|---|---|
| 2004/0100953 A1* | 5/2004 | Chen et al. | 370/389 |
| 2004/0189693 A1* | 9/2004 | Kenig | 345/736 |
| 2005/0091361 A1* | 4/2005 | Bernstein et al. | 709/223 |
| 2005/0198247 A1* | 9/2005 | Perry et al. | 709/223 |
| 2007/0208840 A1* | 9/2007 | McConville et al. | 709/223 |
| 2008/0056223 A1* | 3/2008 | Manser | 370/342 |
| 2008/0123586 A1* | 5/2008 | Manser | 370/328 |
| 2008/0209333 A1* | 8/2008 | Frei | 715/736 |
| 2008/0225875 A1* | 9/2008 | Wray et al. | 370/419 |
| 2009/0129385 A1* | 5/2009 | Wray et al. | 370/392 |
| 2009/0249213 A1* | 10/2009 | Murase et al. | 715/735 |
| 2010/0064225 A1* | 3/2010 | Cunningham et al. | 715/736 |
| 2010/0074141 A1* | 3/2010 | Nguyen | 370/254 |
| 2011/0283278 A1* | 11/2011 | Murrell et al. | 718/1 |
| 2012/0066606 A1* | 3/2012 | Zavgren, Jr. | 715/736 |
| 2012/0317491 A1* | 12/2012 | Wong et al. | 715/736 |
| 2013/0058215 A1* | 3/2013 | Koponen et al. | 370/241 |

\* cited by examiner

Fig.3

30 CONFIGURATION TABLE

| SW_ID (31) | PORT NUMBER (32) | CONNECTION ATTRIBUTE (33) | COMPUTER ID/SW_ID (34) | VLAN_ID (35) |
|---|---|---|---|---|
| SWITCH a | 1 | | COMPUTER a | VLANa |
| | 2 | | COMPUTER b | — |
| | 3 | | SWITCH b | VLANa |
| | 4 | | COMPUTER c | VLANa |
| SWITCH b | 1 | | COMPUTER d | VLANb |
| | 2 | | COMPUTER e | VLANb |
| | 3 | | SWITCH a | VLANa |
| | 4 | | COMPUTER f | VLANa |
| | 5 | | COMPUTER g | VLANb |

ADDING VLANb IN MODEL CASE

Fig.5

50 SETTING INFORMATION TABLE

| ELEMENT ID | SETTING ITEM | | ROW/COLUMN NUMBER | INITIAL DISPLAY |
|---|---|---|---|---|
| | NAME | ----- | | |
| COMPUTER a | — | | FIRST ROW | ○ |
| COMPUTER b | — | | SECOND ROW | ○ |
| COMPUTER c | — | | THIRD ROW | ○ |
| COMPUTER d | — | | FOURTH ROW | ○ |
| COMPUTER e | — | | FIFTH ROW | ○ |
| COMPUTER f | — | | SIXTH ROW | ○ |
| COMPUTER g | — | | — | × |
| VLANa | NWa | | FIRST COLUMN | ○ |
| VLANb | NWb | | SECOND COLUMN | ○ |

60 OF CONTROL TABLE

| VIRTUAL NETWORK ID | COMPUTER ADDRESS |
|---|---|
| VIRTUAL NWa | ADDRa, ADDRc, ADDRf |
| VIRTUAL NWb | ADDRd, ADDRe, ADDRg |

Fig.18

70 VIRTUAL CONFIGURATION TABLE

| COMPUTER ID / VIRTUAL NETWORK ID | COMPUTER a | COMPUTER b | COMPUTER c | COMPUTER d | COMPUTER e |
|---|---|---|---|---|---|
| NWa | ○ (CONNECTION DESIGNATION 42) | ○ (CONNECTION DESIGNATION 42) | ○ (CONNECTION DESIGNATION 42) | × | × |
| NWb | × | × | × | ○ (CONNECTION DESIGNATION 42) | ○ (CONNECTION DESIGNATION 42) |

DISPLAY APPARATUS, DISPLAY METHOD, AND DISPLAY PROGRAM

This application is based upon and claims the benefit of priority from Japanese Patent Application No. 2012-092182, filed on Apr. 13, 2012, the disclosure of which is incorporated herein in its entirety by reference.

TECHNICAL FIELD

The present invention relates to a display apparatus, a display method and a display program. In particular, the present invention relates to a display apparatus, a display method and a display program which provide GUI (Graphical User Interface) for displaying information on a system in which a plurality of computers communicate.

BACKGROUND ART

It is not easy to grasp a configuration including a plurality of computers and a network which connects the plural computers each other. Furthermore, it is generally difficult to design the configuration, and to set configuration information to equipment, which is included in the network, on the basis of the design result. In order to make the work mentioned above easy, several arts are proposed.

Patent document 1 discloses a virtual network designing apparatus. The apparatus displays a physical network configuration, which includes a node such as a LAN (Local Area Network) switch and a line between the nodes, on a display screen, and supports a user so that the user may design a virtual network through selecting a part of the physical network configuration. The apparatus displays the physical network configuration and a virtual network configuration on the display screen with overlapping the physical network configuration and the virtual network configuration, and then the user selects a line which is included in the physical network configuration displayed on the display screen, and adds a link of the virtual network on the line or erases the link. Therefore, it is possible that the user designs VLAN (Virtual Local Area Network) or the like by use of the apparatus with looking over a whole network.

Patent document 2 discloses a management computer which displays topology of an information system in a form similar to a matrix (refer to FIG. 4). The management computer classifies an object (switch or computer), which is included in the information system, into LAN (Local Area Network), a computer node or the like, and arranges the classified object in a form of a grid having predetermined number of columns each of which is corresponding to the classified object, and variable number of rows. In the arrangement, the objects, which are connected each other, are arranged in the same row.

PATENT DOCUMENT

[Patent document 1] Japanese Patent No. 3896310
[Patent document 2] Japanese Patent Application Laid-Open Publication No. 2011-517346

SUMMARY

Even if the above-mentioned art is used, it is still difficult to grasp the plural computers and the network which connects the plural computers to each other, and to design the network, and to set a parameter to the equipment, which is included in the network, on the basis of the design result. The user of the apparatus described in the patent document 1 has to grasp a whole of the network configuration with reference to the complicated display screen which displays the physical network configuration and the virtual network configuration with overlapping the physical network configuration and the virtual network. Furthermore, the user has to design the network in consideration of a whole of the topology of the physical network and a whole of the topology of the virtual network. The user of the management computer according to the patent document 2 has to grasp the network configuration with reference to the complicate display screen. Furthermore, before using the management computer, the user has to design the network and has to set the configuration information.

An exemplary object of the invention is to provide a display apparatus, a display method and a display program which solve the above-mentioned problem.

An apparatus according to an exemplary embodiment of the present invention comprises a display unit which displays information on a system, which includes a plurality of system resources and one or more than one networks connecting the system resources, on a screen of a display device, wherein the display unit displays system resource identifiers which identify the system resources respectively, and network identifiers which identify the networks respectively, and furthermore displays a state of connection between the system resource and the network at an area determined on the basis of the displayed system resource identifier and the displayed network identifier, on the screen.

A method according to an exemplary embodiment of the present invention is a method of displaying information on a system, which includes a plurality of system resources and one or more than one networks connecting the system resources each other, on a screen of a display device, comprises displaying system resource identifiers which identify the system resources respectively, and network identifiers which identify the networks respectively; and displaying a state of connection between the displayed system resource and the displayed network at an area determined on the basis of the displayed system resource identifier and the displayed network identifier, on the screen.

A computer readable non-transitory medium according to an exemplary embodiment of the present invention stores a program which makes a computer carry out a process of displaying information on a system, which includes a plurality of system resources and one or more than one networks connecting the system resources each other, on a screen of a display device, wherein the program makes the computer carry out a process of displaying system resource identifiers which identify the system resources respectively, and network identifiers which identify the networks respectively; and displaying a state of connection between the displayed system resource and the displayed network at an area determined on the basis of the displayed system resource identifier and the displayed network identifier, on the screen.

BRIEF DESCRIPTION OF THE DRAWINGS

Exemplary features and advantages of the present invention will become apparent from the following detailed description when taken with the accompanying drawings in which:

FIG. 3 shows a configuration table 30 which a configuration storing unit 5 stores;

FIG. 5 shows a setting information table 50 which the configuration storing unit 5 stores;

FIG. 14 shows composition of an OF control table 60 which an OF configuration storing unit 5A stores;

FIG. 18 shows composition of a virtual configuration table 70 which a virtual configuration storing unit 5B stores;

EXEMPLARY EMBODIMENT

Next, a detailed explanation will be given for a first exemplary embodiment with reference to the drawings.

Figure 1:
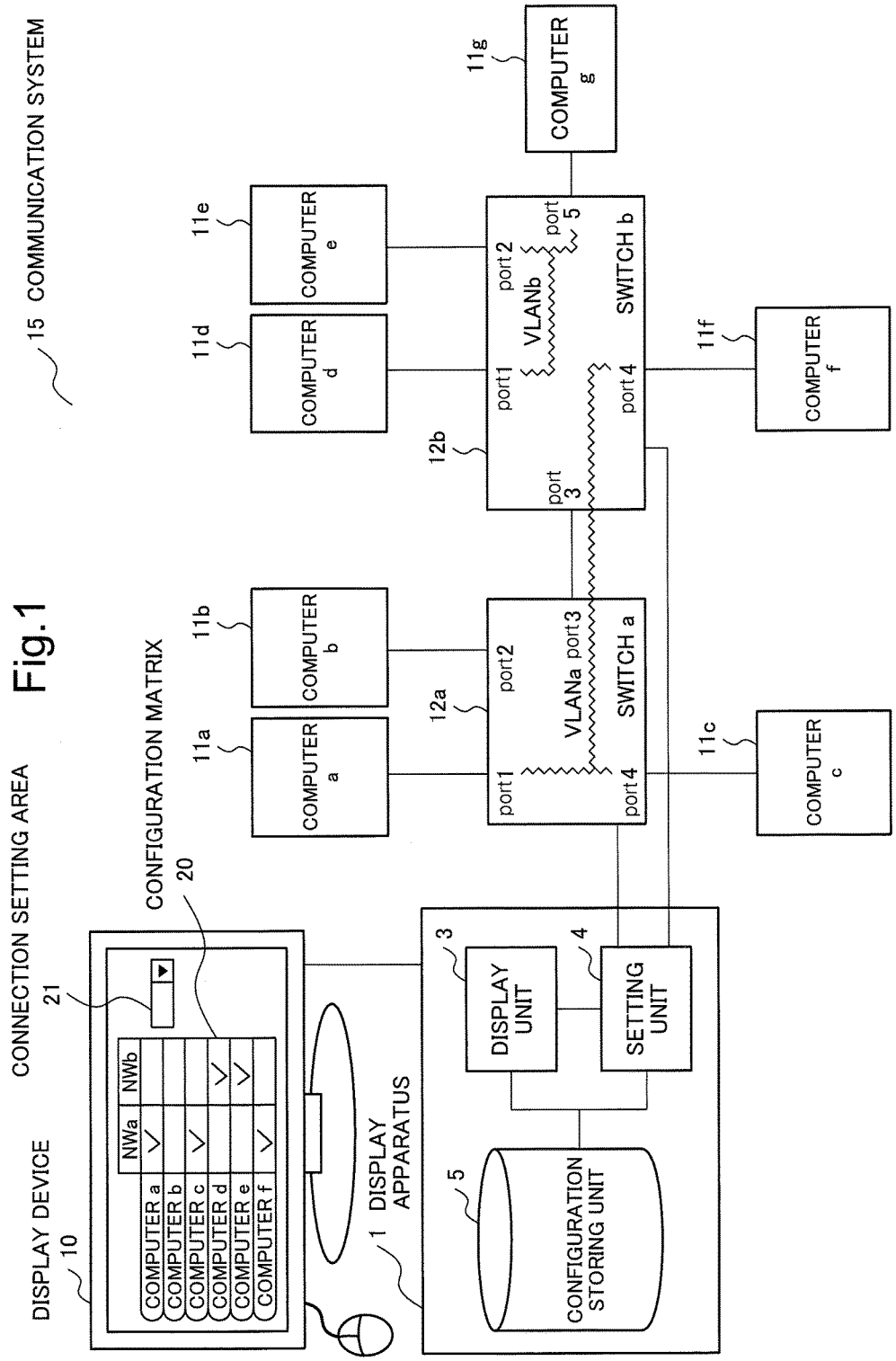
FIG. 1 shows a configuration of a communication system 15 according to a first exemplary embodiment.

FIG. 1 shows an example of a configuration of a communication system 15 according to the first embodiment of the present invention. The communication system 15 includes a display apparatus 1, a plurality of computers 11, one or more than one switches 12 each of which realizes VLAN connecting the computers 11 each other, and a display device 10. A plurality of the computers 11, for example, execute a job application program and manage a database. The display apparatus 1 in the communication system 15 works schematically as shown in the following.

The display apparatus 1 displays a configuration matrix 20 on the display device 10. The configuration matrix 20 has a column corresponding to each VLAN which is included in the communication system 15, and a row corresponding to each computer 11.

Next, when a user wants to set connection between a certain computer 11 and a certain VLAN, the user selects a cell, which is corresponding to an area where the row corresponding to the computer 11 and the column corresponding to VLAN cross, through clicking a mouse.

The display apparatus 1, which detects selection of the cell, displays a connection setting area 21 on the display device 10. When the user inputs connection setting information 40 in the connection setting area 21, the display apparatus 1 sets the connection between the computer 11 and VLAN, which are corresponding to the cell, on the basis of the connection setting information 40.

Here, the connection setting information 40 includes, for example, information on designation whether the connection exists or not, a limitation value of an amount of flow, and information which designates the protocol filtering. In order to make, for example, the limitation value of an amount of the flow, and the designation of the protocol filtering effective, it is necessary that the switch 12 permits these setting. A display unit 3 displays choices of the connection setting information 40, for example, in a form of the pull-down menu in the connection setting area 21.

The example of the communication system 15 shown in FIG. 1 includes seven computers 11 (computers 11a to 11g) and two switches 12 (switches 12a and 12b). The switch 12 is, for example, the layer 2 switch or the layer 3 switch. The switch 12 realizes one or more than one VLANs each of which connects ports designated by configuration defining information.

The computer 11 or another switch 12 is connected with one out of a plurality of the ports of the switch 12. According to FIG. 1, the computer 11a, the computer 11b and the computer 11c are connected with the first, second and fourth ports of the switch 12a respectively. The computer 11d, the computer 11e, the computer 11f and the computer 11g are connected with the first, second, fourth and fifth ports of the switch 12b respectively. The switch 12a and the switch 12b are connected each other through the third port of the switch 12a and the third port of the switch 12b.

Two switches 12a and 12b in FIG. 1 realize two VLANs, which are, VLANa and VLANb respectively. Three computers, that is, the computer 11a, the computer 11c and the computer 11f are connected with VLANa. Three computers, that is, the computer 11d, the computer 11e and the computer 11g are connected with VLANb. The computers 11, which are connected with the same VLAN respectively, can communicate each other through the VLAN.

The display apparatus 1 includes the display unit 3, a setting unit 4 and a configuration storing unit 5. The configuration storing unit 5 stores a configuration table 30 which shows the configuration of the computers 11 and VLANs included in the communication system 15. The display unit 3 acquires, for example, information on the configuration of the computers 11 and VLANs, which are included in the communication system 15, from the configuration storing unit 5. It may be preferable that the display unit 3 acquires the configuration information through inquiring of computers 11 and switches 12.

Furthermore, the display unit 3 displays the configuration matrix 20 on the display device 10 on the basis of the acquired configuration information. Moreover, the display unit 3 detects that the user selects the cell of the configuration matrix 20, and then displays the connection setting area 21 on the display device 10, and acquires the connection setting information 40 from the area, and outputs the acquired connection setting information 40 to the setting unit 4.

The setting unit 4 sets the connection between the computer 11 and the VLAN, which is corresponding to the cell designated by the user, on the basis of the connection setting information 40 acquired from the display unit 3.

According to the example of the configuration shown in FIG. 1, the configuration matrix 20 has the column corresponding to each of VLANs (VLANa and VLANb) included in the communication system 15, and the row corresponding to each of the computers 11 (computers 11a to computer 11f) included in the communication system 15.

The display unit 3 displays a name of the computer 11 in each row of the configuration matrix 20 and displays a name of VLAN in each column. That is, the display apparatus 1 displays "NWa" and "NWb", which are the names of VLANa and VLANb respectively, in the columns corresponding to VLANa and VLANb.

Here, the name of VLAN is generally different from VLAN_ID which the switch 12 uses as a tag or the like in a tagged frame. The name of VLAN is a network identifier which makes the user recognize VLAN with ease. For example, "accounting department LAN" and "sales department LAN" are exemplified. In the following description, VLAN_ID will be expressed as VLANa or VLANb, and the name of VLAN will be expressed as NWa or NWb.

The name of VLAN and VLAN_ID are in a relation of one-to-one correspondence, and the display apparatus 1 stores the information on the correspondence between the name of VLAN and VLAN_ID, and carries out conversion between the name of VLAN and VLAN_ID appropriately. It may be preferable that the name of VLAN and VLAN_ID are the same, and it may be preferable that the name of the computer 11 is the same as internal identification information or is different from the internal identification information.

It may be preferable that in each cell of the configuration matrix 20, the display unit 3 displays a part of information on the connection between the computer 11 corresponding to the row of the cell, and VLAN corresponding to the column of the cell, for example, information which indicates whether the connection between the computer and VLAN exists or not. In the configuration matrix 20 shown in FIG. 1, a cell in which a check mark is written indicates that the computer 11 corresponding to the row of the cell is connected with VLAN corresponding to the column of the cell. For example, an upper and left end cell indicates that the computer 11a is connected with VLANa. On the other hand, a blank cell indicates that the computer 11 corresponding to the row of the cell is not connected with VLAN corresponding to the column of the cell. For example, an upper and right end cell indicates that the computer 11a is not connected with VLANb.

Here, it may be preferable that the display unit 3 displays only a part of the plural computers 11 and the plural VLANs included in the communication system 15. For example, in the configuration matrix 20 shown in FIG. 1, the display unit 3 does not display the computer 11g.

Moreover, while the connection setting area 21 is displayed outside the configuration matrix 20 in FIG. 1, it may be preferable that the connection setting area 21 is not displayed outside the configuration matrix 20. It may be preferable that the display unit 3 displays the connection setting area 21 overlapping with the cell which is designated by the user.

The display unit 3, the setting unit 4 and the configuration storing unit 5 of the display apparatus 1 according to the exemplary embodiment are composed of a logic circuit, a storage apparatus or the like. It may be preferable that the display apparatus 1 is a computer which works with program control. In this case, it may be preferable that the display unit 3 or the setting unit 4 is realized through a processor of the computer, reading a program which is stored in the storage apparatus, and executing the program. It may be preferable that the configuration storing unit 5 includes a disk apparatus or the like included in the computer.

Figure 2:
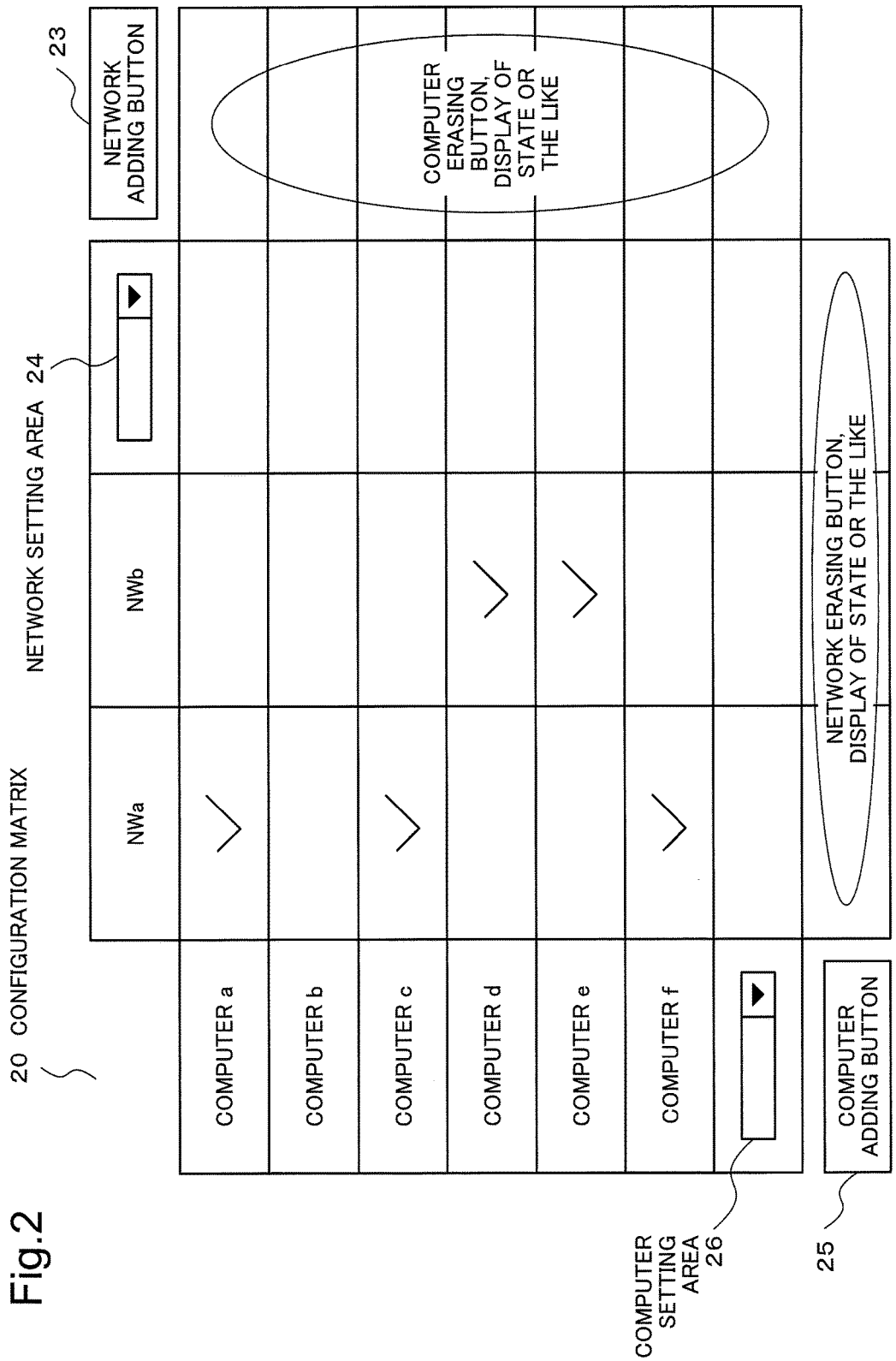
FIG. 2 shows GUI which is used for adding a computer 11 and a network to a configuration matrix 20.

FIG. 2 shows the GUI which is used for adding the computer 11 and the network to the configuration matrix 20. In this example, the display unit 3 displays a network adding button 23 and a computer adding button 25 on the display device 10 in addition to the configuration matrix 20.

When the user presses down the network adding button 23, which is displayed on the display device 10, through the user's clicking a mouse, etc., the display unit 3 detects pressing of the button and adds a new column, which is corresponding to a new network, to the configuration matrix 20.

At this time, the display unit 3 displays a network setting area 24, which is used for acquiring setting information on the new network, on the display device 10. The display unit 3 acquires the new network setting information which the user inputs in the network setting area 24.

Here, the new network setting information is attribute information of the network. The network setting information is, for example, the name of the network, the limitation value of an amount of data which flows through the network, and the information which designates the protocol filtering. In order to make, for example, the limitation value of an amount of the flow, and the designation of the protocol filtering effective, it is necessary that the switch 12 permits such setting. That is, it is necessary that the switch 12, which is provided with such setting information, limits the flow of a VLAN and carries out the protocol filtering to input data of the VLAN.

The display unit 3 displays choices of the new network setting information, for example, in a form of the pull-down menu in the network setting area 24.

As the case of adding the new network, there are two cases, that is, a case of generating a new network, and a case of displaying a network which exists in the communication network 15 but is not displayed. The network setting information includes information to distinguish two cases.

When it is designated to generate a new network, the setting unit 4 generates a new VLAN which has an attribute specified by the acquired network setting information. That is, the setting unit 4 generates definition information on the new VLAN having the attribute, and sends the definition information to the switch 12.

When it is designated to display the network which exists in the communication system 15, the display unit 3 displays a list of the VLANs, which exist in the communication system 15 but are not displayed, in the network setting area 24 in the form of the pull-down menu or the like. When the user designates VLAN which should be displayed, the display unit 3 associates VLAN with the column which is added newly, and stores the association information.

Here, at this time, it may be preferable that the setting unit 4 assigns a new attribute, which is specified by the acquired network setting information, to VLAN. That is, it may be preferable that the setting unit 4 generates definition updating information on VLAN for assigning the new attribute, and sends the definition updating information to the switch 12.

Also in the case that the user presses down the computer adding button 25, which is displayed on the display device 10, through the user's clicking the mouse etc., the display unit 3 detects that the user presses down the button, and adds a new row, which is corresponding to a new computer, to the configuration matrix 20.

At this time, the display unit 3 displays a computer setting area 26, which is used for acquiring the setting information on the new computer 11, on the display device 10. The display unit 3 acquires the setting information on the new computer 11 which the user inputs by use of the computer setting area 26.

Here, the setting information on the new computer 11 is, for example, the name of the computer 11 and information to designate an OS (Operating System) account name which the computer 11 should have. The display unit 3 displays choices of the setting information on the new computer 11 in the computer setting area 26, for example, in the form of the pull-down menu.

As the case of adding the new computer 11, there are two cases, that is, a case of generating the new computer, and a case of displaying the computer 11 which exists in the communication network 15 but is not displayed. The setting information on the computer 11 includes information to distinguish the two cases.

In the case that the computer 11 is a virtual computer, generating the new computer is effective. When it is designated to generate a new virtual computer, the setting unit 4 generates the new virtual computer which has an attribute specified by the acquired setting information on the computer 11.

When it is designated to display the computer 11 which exists in the communication system 15 but is not displayed, the display unit 3 displays a list of the computers 11, which exist in the communication system 15 but are not displayed, in the network setting area 24 in the form of the pull-down menu or the like. When the user designates the computer 11 which should be displayed, the display unit 3 associates the computer 11 with the row which is added newly, and stores the association information.

Here, at this time, it may be preferable that the setting unit 4 assigns a new attribute, which is specified by the acquired setting information on the computer 11, to the computer 11. That is, it may be preferable that the setting unit 4 generates designation information for assigning the new attribute, for example, for generating a new OS account, and sends the designation information to the computer 11.

Here, if there is no specific remark in the following description, it is assumed that the computer 11 is not a virtual computer but a real computer.

It may be preferable that the display unit 3 displays a network erasing button which erases a column of the configuration matrix 20, or a network state displaying button, in each column of the configuration matrix 20. When the network erasing button is pressed down, each of the display unit 3 and the setting unit 4 carries out an operation which is contrary to one carried out at a time when the network adding button 23 is pressed down. When the network state displaying button is pressed down, the display unit 3 outputs the state information on the VLAN which is corresponding to the column.

It may be preferable that the display unit 3 displays a computer erasing button which erases a row of the configuration matrix 20, or a computer state displaying button, in each row of the configuration matrix 20. When the computer erasing button is pressed down, each of the display unit 3 and the setting unit 4 carries out an operation which is contrary to one carried out at a time when the computer adding button 25 is pressed down. When the computer state displaying button is pressed down, the display unit 3 outputs the state information on the computer which is corresponding to the row.

FIG. 3 shows the configuration table 30 which the configuration storing unit 5 stores. The configuration table 30 includes a plurality of records (rows) including SW_ID 31, a port number 32, a connection attribute 33, a computer ID/SW_ID 34 and VLAN_ID 35.

The SW_ID 31 is an identifier of the switch 12 which the communication system 15 includes. The port number 32 is assigned to a port of the switch 12. The connection attribute 33 is information on the connection between the VLAN which is set to the port of the switch 12, and the computer 11 which is connected with the port of the switch 12. The computer ID/SW_ID 34 is an identifier of the computer 11 or the switch 12 which is connected with the port of the switch 12. VLAN_ID 35 is an identifier of the VLAN which is set to the port of the switch 12. An example of data shown in FIG. 3 shows the configuration table 30 corresponding to the example of the configuration shown in FIG. 1.

SW_ID 31, the port number 32 and the computer ID/SW_ID 34, which are data items on the physical connection, are set, for example, by a designer of the communication system 15. It may be preferable that the display unit 3 or the like makes an inquires on SW_ID 31, the port number 32 and the computer ID/SW_ID 34 to the computer 11 and the switch 12, and acquires the values which are set to the configuration table 30.

In the case that VLAN is set among some computers 11 as an initial state of the communication system 15, the designer of the communication system 15 sets initial values of VLAN_ID 35 and the connection information 33 concerning the initial setting.

Figure 4:
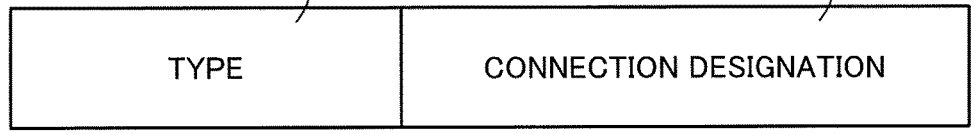
FIG. 4 shows an example of composition of connection setting information 40.

FIG. 4 shows an example of composition of the connection setting information 40. For example, the display unit 3 acquires the connection setting information 40 from the connection setting area 21. It may be preferable that the display unit 3 acquires the connection setting information 40 from a keyboard or the like of the display device 10.

The connection setting information 40 includes a type 41 and a connection designation 42. The type 41 designates "connected state", meaning the computer 11 which is corresponding to the cell of the configuration matrix 20 is connected with VLAN which is corresponding to the cell, or "not-connected state", meaning the computer 11 is released from the connected state.

In the case of the connected state, the connection designation 42 designates attribute information on the connection. The connection designation 42 is, for example, the limitation of an amount of flow, the designation of the protocol filter, the IP address and an available user name.

The limitation of an amount of flow indicates an available speed at which the computer 11 corresponding to the cell carries out data communicates through the VLAN corresponding to the cell. The limitation value of an amount of flow is, for example, 100 Mbps, 1 Gbps or the like. However, the highest communication speed between two computers 11 is determined by the minimum value out of each limitation value of two computers 11 and the limitation value of an amount of flow of the VLAN connecting the two computers 11. In the case that the switch 12 permits such designation for each port, the limitation value of an amount of flow is effective.

To designate the protocol filter means to designate an upper layer protocol frame which the computer 11 corresponding to the cell sends and receives through VLAN corresponding to the cell. For example, designating a port number of TCP (Transfer Control Protocol) is exemplified. In the case that the switch 12 permits such designation for each port, the value is effective.

FIG. 5 shows a setting information table 50 which the configuration storing unit 5 stores. The setting information table 50 includes a plurality of records (rows) each of which includes an element ID 51, a setting item 52, a row/column number 53 and an initial display 54. The element ID 51 stores an identifier of the computer 11 (computer ID) or VLAN_ID.

The setting item 52 stores an attribute on the computer 11 or the VLAN which are specified by the element ID 51. The attribute of the computer 11 is, for example, the name and the OS account to be held. In the case that the computer 11 is a virtual computer, it may be preferable that the attribute of the computer 11 includes configuration information such as a size of memory, a number of disks or the like, designation of a host computer in which the computer 11 is deployed or the like. The attribute of VLAN is, for example, the name, the limitation value of an amount of flow and the designation of the protocol filter. In the case of no name, a null mark ("–" in FIG. 5) is stored.

The row/column number 53 indicates a row number assigned to the row, which is corresponding to the computer 11 specified by the element ID 51, in the configuration matrix 20, or the row/column number 53 indicates a column number assigned to a column, which is corresponding to the VLAN specified by the element ID 51, in the configuration matrix 20.

The initial display 54 stores designation whether initially displaying or not displaying the corresponding computer 11 or VLAN on the configuration matrix 20 by use of a mark (O) or a mark (X) respectively.

In the case that some computers 11 and some VLANs are included in the initial state of the communication system 15, the designer of the communication system 15 sets an initial value of the setting information table 50 for these computers 11 and VLANs. Therefore, in the case that the computer 11 is a real computer, records corresponding to all computers 11 are generated, and the setting item 52 and the initial display 54 are set. In the case that the setting item 52 includes a plurality of data items, it may be preferable that not all data items are always set.

Here, in the case that there is no computer setting information corresponding to each computer 11, and there is no network setting information corresponding to each VLAN, it may be preferable that the setting information table 50 does not include the setting item 52. Furthermore, in the case of displaying all computers 11 and all VLANs always, it may be preferable that the setting information table 50 does not include the initial display 54.

Figure 6:
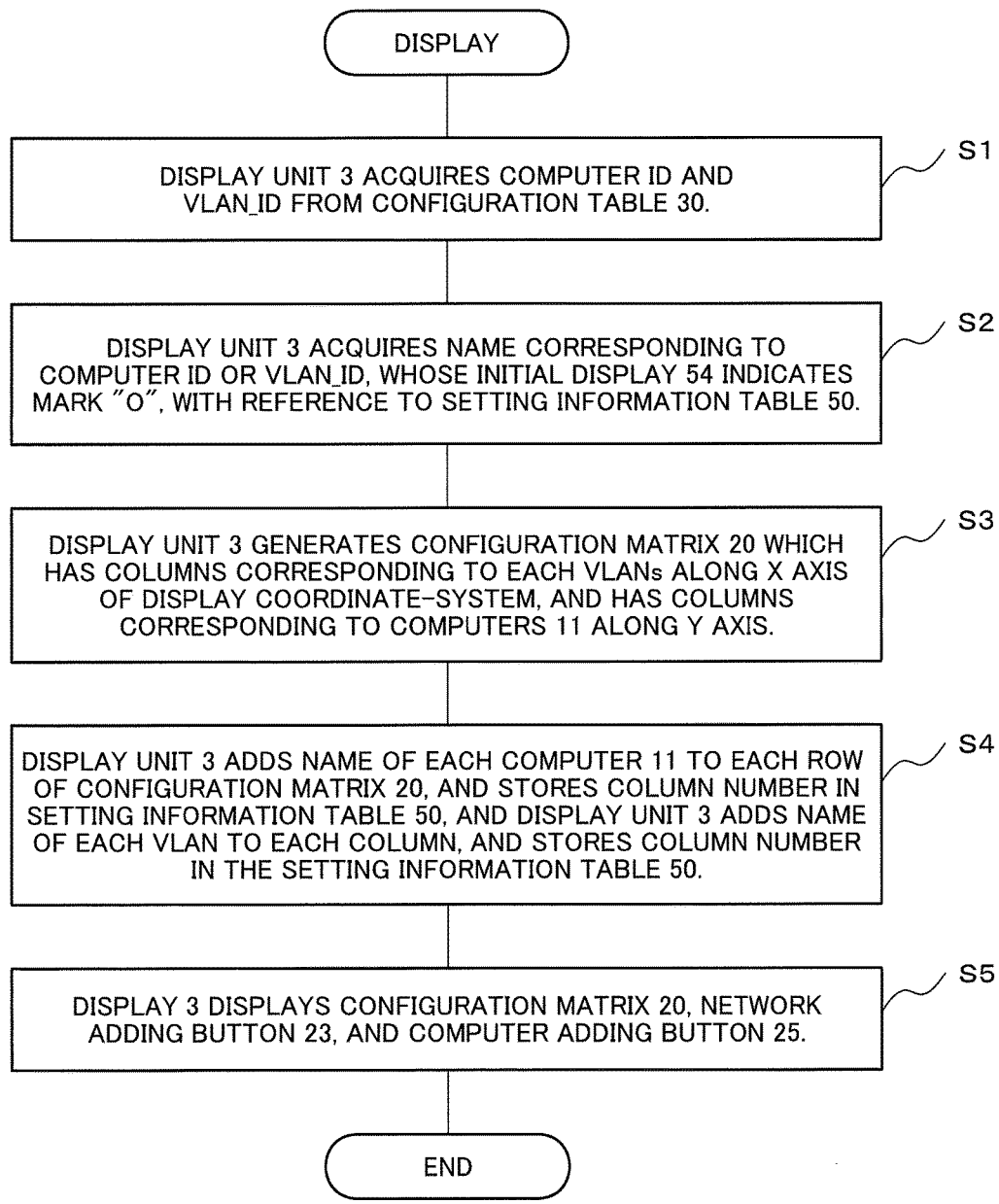
FIG. 6 is an operational flowchart carried out when a display apparatus 1 displays the configuration matrix 20 initially.

FIG. 6 is an operational flowchart carried out when the display apparatus 1 displays the configuration matrix 20 initially. The display unit 3 acquires all computer IDs and all VLAN_IDs from the column of the computer ID/SW_ID 34 and the column of VLAN_ID 35 with reference to the configuration table 30 (S1).

Next, the display 3 acquires the name corresponding to the computer ID or VLAN_ID, whose initial display 54 is checked by the mark "O", with reference to the setting information table 50 (S2).

Here, it may be preferable that each record of the setting information table 50 stores a group ID instead of the initial display 54. In this case, the display unit 3 selects the computer ID and VLAN_ID belonging to a group which is designated to be displayed initially.

The display unit 3 generates the configuration matrix 20, which has columns corresponding to the VLANs along a X axis of a two-dimensional display coordinate-system set on the screen of the display device 10, and rows corresponding to the computers 11 along a Y axis, for example, on a screen buffer (S3).

Here, the two-dimensional display coordinate-system is defined, for example, by a parameter in advance. The parameter is; for example, coordinate of a position on the screen which is corresponding to an origin point of the two-dimensional display coordinate-system, and a rotation angle of the X axis and the Y axis to a horizontal axis of the screen. Here, the X axis and the Y axis mean one axis and the other axis of the two-dimensional coordinate axes which cross at the right angle each other. Then, it is not always true that the X axis is horizontal and the Y axis is vertical. That is, it may be preferable that the X axis is vertical and the Y axis is horizontal. Furthermore, it may be preferable that two axes, which cross at the right angle each other, rotate together at a predetermined angle.

The above mentioned situation is applied also to the row and the column displayed on the screen. That is, it is not always true that the row is arranged horizontally and the column is arranged vertically. It may be preferable that the row is arranged vertically and the column is arranged horizontally or it may be preferable that both rotate together at a predetermined angle.

The display unit 3 adds each name of the computer 11 in each of generated rows of the configuration matrix 20 and stores the row number in the row/column number 53 of the setting information table 50. The display unit 3 adds the name of VLAN in each column and stores the column number in the row/column number 53 of the setting information table 50 (S4).

The display unit 3 outputs the configuration matrix 20, which is in the screen buffer, on the screen of the display device 10. At this time, the display unit 3 displays the network adding button 23 and the computer adding button 25 on the display device 10 (S5).

Figure 7:
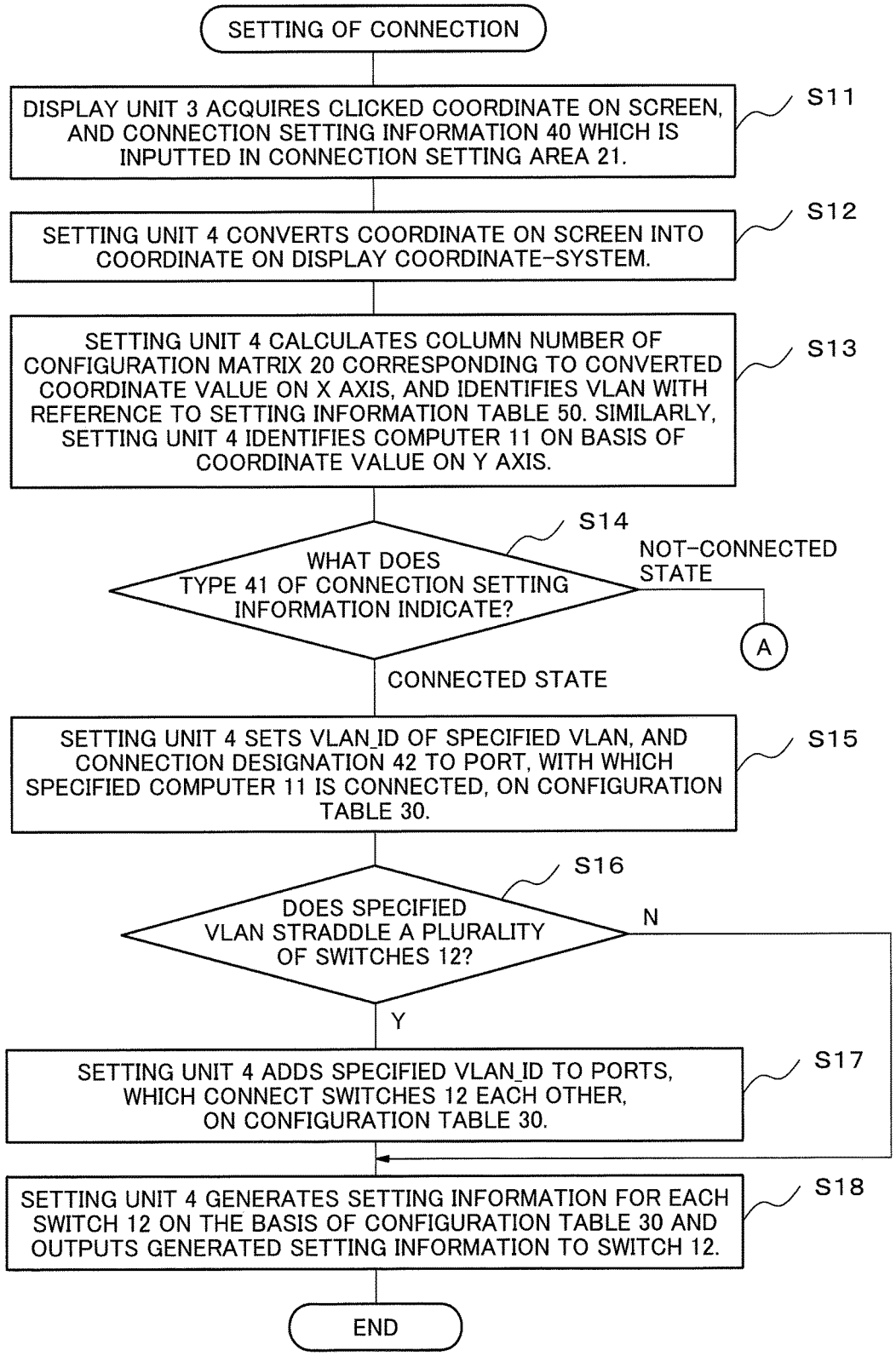
FIG. 7 is an operational flowchart (1/2) carried out when the display apparatus 1 sets connection between the computer 11 and VLAN which are designated.
Figure 8:
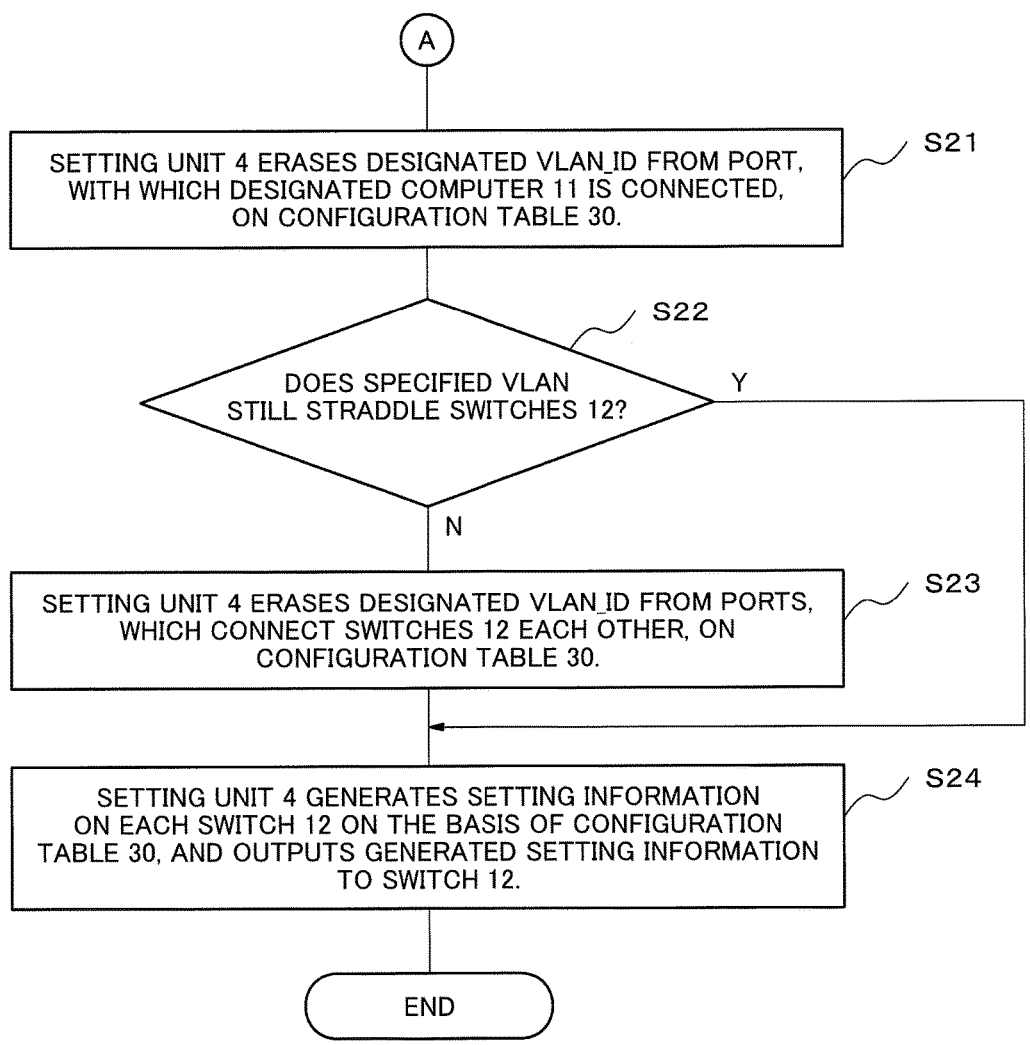
FIG. 8 is an operational flowchart (2/2) carried out when the display apparatus 1 sets the connection between the computer 11 and VLAN which are designated.

FIG. 7 and FIG. 8 are an operational flowchart carried out when the display apparatus 1 sets the connection between the computer 11 and the VLAN which are designated. When the user selects a certain cell of the configuration matrix 20, the operation starts. While the cell is selected usually through clicking a mouse or the like, it may be preferable to select the cell through inputting the cell number or the like by use of a keyboard.

When the display unit 3 detects the click, the display unit 3 displays the connection setting area 21 on the screen, and acquires coordinate of a clicked position on the screen, and the connection setting information 40 which is inputted in the connection setting area 21 (S11).

The setting unit 4 converts the coordinate on the screen, which the display unit 3 acquires, into coordinate on the display coordinate-system (S12). Furthermore, the setting unit 4 calculates the column number corresponding to the converted X axis coordinate value, and specifies VLAN with reference to the column number 53 of the setting information table 50. Similarly, the setting unit 4 calculates the row number corresponding to the converted Y axis coordinate value, and specifies the computer 11 with reference to the column number 53 of the setting information table 50 (S13).

Here, a model case will be explained as an example. According to the model case, the user clicks a cell, which is corresponding to the computer b and NWb in the configuration matrix 20 shown in FIG. 1, in the communication system 15 which is in a connection state shown in FIG. 1 and FIG. 3. In the model case, the setting unit 4 calculates on the basis of the coordinate of the clicked position that the selected cell is corresponding to a cell which is included in the second row and the second column, and specifies the computer b and VLANb on the basis of the setting information table 50.

In the case that the type 41 of the connection setting information 40 indicates "connected state" (S 14), the setting unit 4 sets VLAN_ID of the specified VLAN and the connection designation 42 of the connection setting information 40 to the port, with which the specified computer 11 is connected, on the configuration table 30 (S15). Specifically, the setting unit 4 searches for a record, whose computer ID/SW_ID 34 includes the computer ID of the specified computer 11, on the configuration table 30, and stores VLAN_ID of the specified VLAN in VLAN_ID 35 of the record. Furthermore, the setting unit 4 stores the connection designation 42 in the connection attribute 33 of the record.

In case of the above-mentioned model case, the setting unit 4 searches for a record which is related to the second port of the switch a (second row in FIG. 3) and whose computer ID/SW_ID 34 includes the computer b, and stores VLANb in VLAN_ID 35 of the record.

Next, the setting unit 4 judges whether the specified VLAN straddles a plurality of switches 12 (S16) as a result of setting the connection. It is possible to make the judgment through finding out whether VLAN_ID of the specified VLAN is set to a plurality of switches 12 on the configuration table 30 as a result of setting the connection. In case of the model case, the setting unit 4 detects that VLANb straddles between the switch a, and the switch b.

In the case of straddling the switches (Y in S16), the setting unit 4 adds VLAN_ID of the specified VLAN to ports, which connect the switches 12 each other, on the configuration table 30 (S17). Specifically, the setting unit 4 searches for all records, whose computer ID/SW_ID 34 stores SW_ID of the switch 12 to be straddled, on the basis of the configuration table 30, and stores VLAN_ID of the specified VLAN in VLAN_ID 35 of the record.

In the above-mentioned model case, the setting unit 4 searches for a record (seventh row) which is related to the third port of the switch b and whose computer ID/SW_ID 34 stores the switch a, and a record (third row) which is related to the third port of the switch a and which stores the switch b, and adds VLANb to VLAN_IDs 35 of two records.

Finally, the setting unit 4 generates the setting information for each switch 12 on the basis of the configuration table 30, and outputs the setting information to the switch 12 (S18). This is a process for making the switches 12 reflect updated data of the configuration table 30 which is updated due to the new connection. Here, the setting unit 4 has in advance specific information on the switches 12. Contents and formats of the setting information which the setting unit 4 generates, and timing and a means to send the setting information are based on the specific information on the switches 12.

In the above-mentioned model case, the setting unit 4 generates the setting information which makes VLANb added to the ports 2 and 3 of the switch a, and sends the setting information to the switch a. Furthermore, the setting unit 4 generates the setting information which makes VLANb added to the port 3 of the switch b, and sends the setting information to the switch b.

In the case that the type 41 of the connection setting information 40 indicates "not-connected state" in S14, the setting unit 4 erases VLAN_ID of the specified VLAN and the connection designation 42 of the connection setting information 40 from the port, with which the specified computer 11 is connected, on the configuration table 30 (S21). Specifically, the setting unit 4 searches for a record, whose computer ID/SW_ID 34 stores the computer ID of the specified computer 11, on the configuration table 30, and erases VLAN_ID of the specified VLAN from VLAN_ID 35 of the record. Furthermore, the setting unit 4 initializes the connection attribute 33 of the record.

Next, the setting unit 4 judges whether the specified VLAN still straddles the switches 12 as a result of setting the connection (release of connection) (S22). It is possible to make the judgment through finding out whether the VLAN_ID of the specified VLAN is set to only one switch 12 on the configuration table 30 as a result of setting the connection.

In the case that VLAN does not straddle the switches 12 (N in S22), the setting unit 4 erases the VLAN_ID of the specified VLAN from the ports, which connect the switches 12 each other, on the configuration table 30 (S23). Specifically, the setting unit 4 searches for all records, whose computer ID/SW_IDs 34 store the SW_IDs of the switches 12 straddled by the specified VLAN, on the configuration table 30, and erases the VLAN_ID of the specified VLAN from VLAN_ID 35 of the record.

Finally, the setting unit 4 generates the setting information for each switch 12 on the basis of the configuration table 30 and outputs the setting information to the switch 12 (S24). This is a process for making the switches 12 reflect updated data of the configuration table 30 which is updated as a result of setting the connection. Here, the setting unit 4 stores specific data on the switches 12. Contents and a format of the setting information which the setting unit 4 generates, and timing and a means to send the setting information are based on the specific information on the switches 12.

Figure 9:
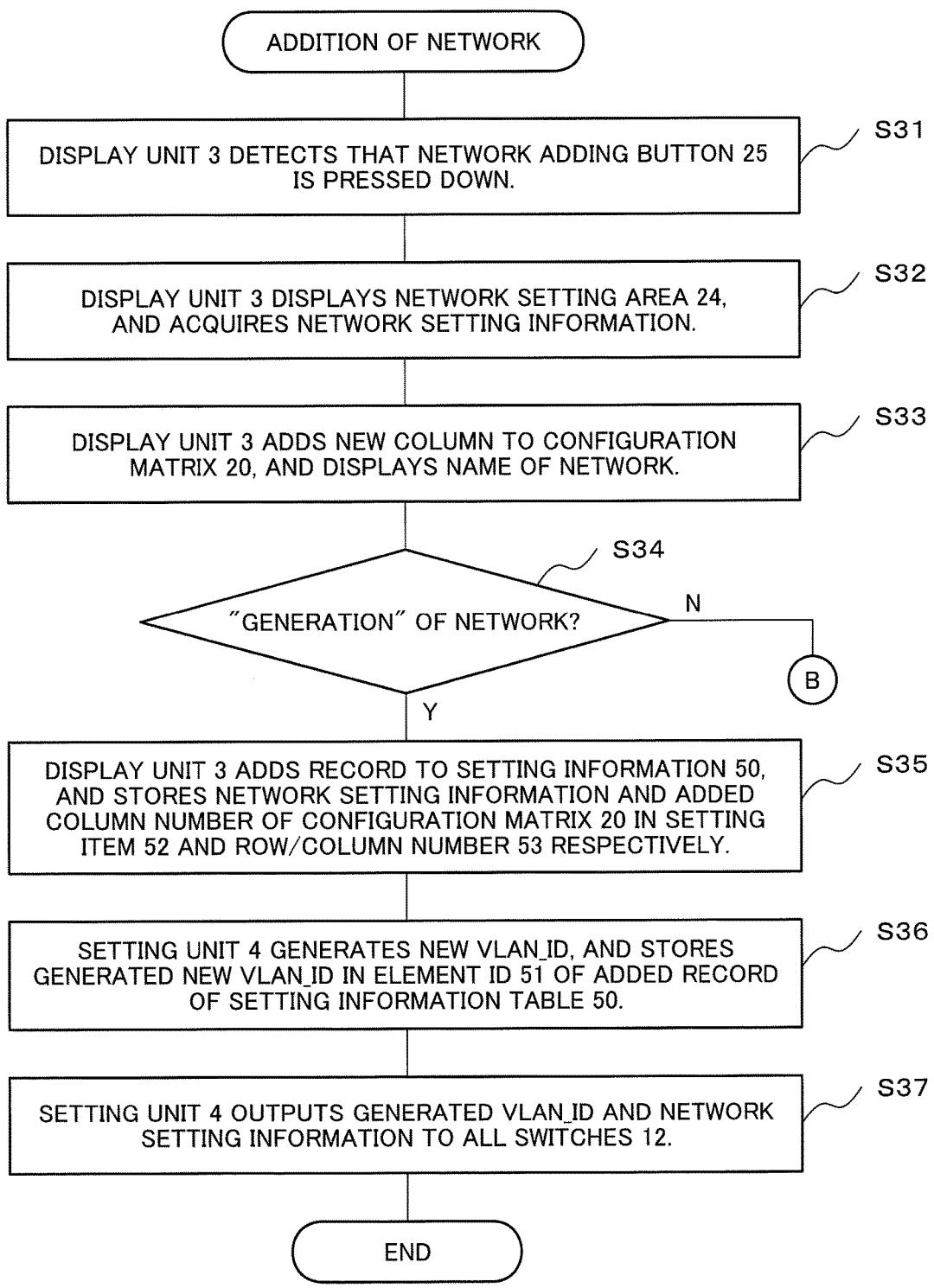
FIG. 9 is an operational flowchart (1/2) carried out when the display apparatus 1 adds a new network.
Figure 10:
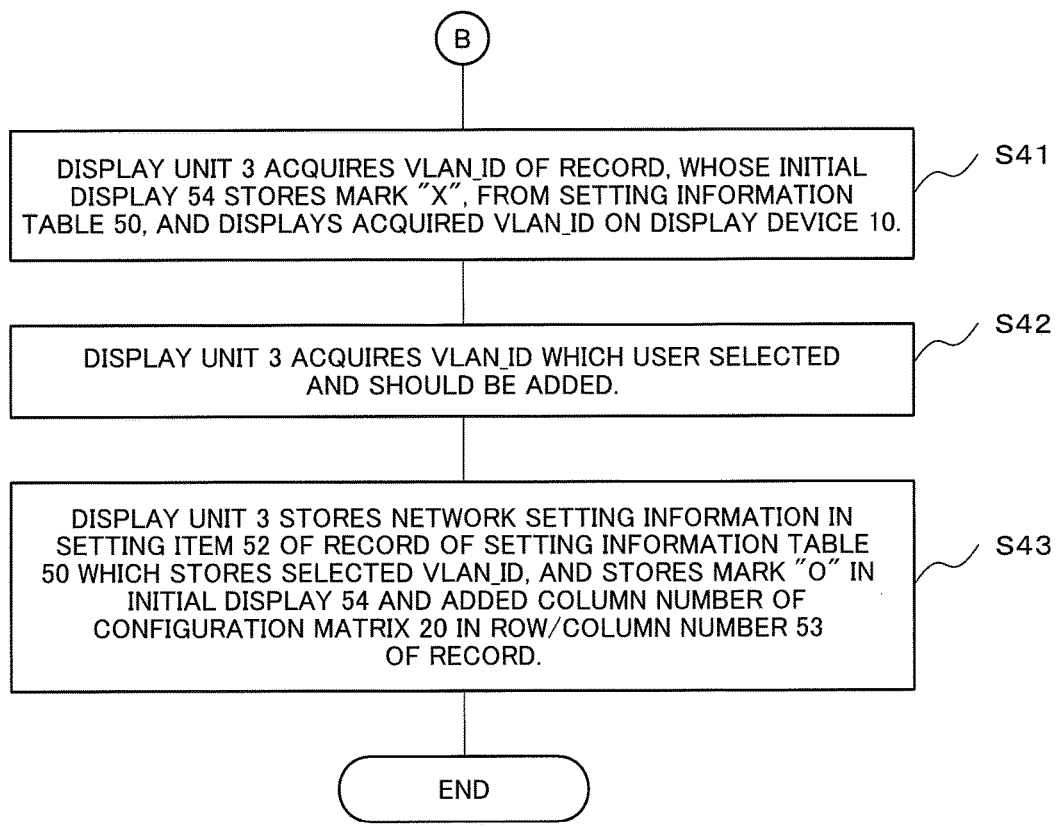
FIG. 10 is an operational flowchart (2/2) carried out when the display apparatus 1 adds the new network.

FIG. 9 and FIG. 10 are an operational flowchart carried out when the display apparatus 1 adds a new network. When the user presses down the network adding button 23, the operation starts.

When the display unit 3 detects that the network adding button 23 is pressed down (S31), the display unit 3 displays the network setting area 24 and acquires the network setting information, which the user inputs, from the network setting area 24 (S32). The network setting information includes the name of the network and a distinction between generating a new network (generation) and displaying an existing network which is not displayed at this moment (display).

The display unit 3 adds a new column to the configuration matrix 20 and displays the name in the column (S33).

In the case that the distinction of the network setting information indicates "generation" (Y in S34), the display unit 3 adds a record to the setting information table 50, and stores the network setting information in the setting item 52, and stores the added column number of the configuration matrix 20 in the row/column number 53. The display unit 3 stores the mark "O" in the initial display 54 (S35).

The setting unit 4 generates a new VLAN_ID and stores the new VLAN_ID in the element ID51 of the record which is added to the setting information table 50 (S36).

Finally, the setting unit 4 sends the generated VLAN_ID and the network setting information to all switches 12 (S37). Here, the network setting information, which is sent to the switches 12, is information, which has an influence on a work of the switches 12, such as the limitation value of an amount of flow. The name or the like is not sent to the switches.

The setting unit 4 has in advance specific information on the switches 12. Contents and a format of the definition information which the setting unit 4 generates, and timing and a means for sending the definition information are based on the specific information on the switches 12. Accordingly, for example, the setting unit 4 does not send, for example, the definition information on the newly generated VLAN at timing when the network adding button 23 is pressed down, but the setting unit 4 may send the definition information in some cases at timing when the computer 11 is connected with the newly generated network, that is, at timing when the port of the newly generated VLAN is determined.

In the case that the distinction of the network setting information is "display" (N in S34), the display unit 3 acquires VLAN_IDs of the records, whose initial display 54 indicate the mark "X", from the setting information table 50, and displays the VLAN_IDs on the display device 10 (S41). The display unit 3 displays, for example, the VLAN_IDs in the network setting area 24 in a form such as the pull-down menu. The user who sees the pull-down menu selects a VLAN which should be added.

The display unit 3 acquires the VLAN_ID which the user selected (S42). The display unit 3 stores the network setting information in the setting item 52 of the record, whose element ID 51 stores the selected VLAN_ID, on the setting information table 50, and sets the mark "O" to the initial display 54 of the record. The display unit 3 stores the added column number of the configuration matrix 20 in the row/column number 53 of the record (S43).

Here, if necessary, the setting unit 4 sends a part of the network setting information to the switches 12. For example, in the case that the network setting information includes designation to carry out the protocol filtering, the setting unit 4 sends the information, which includes the designation, to the switches 12. A format of the information to be sent, and timing and a means for sending the information are based on the specific information on the switches 12.

Figure 11:
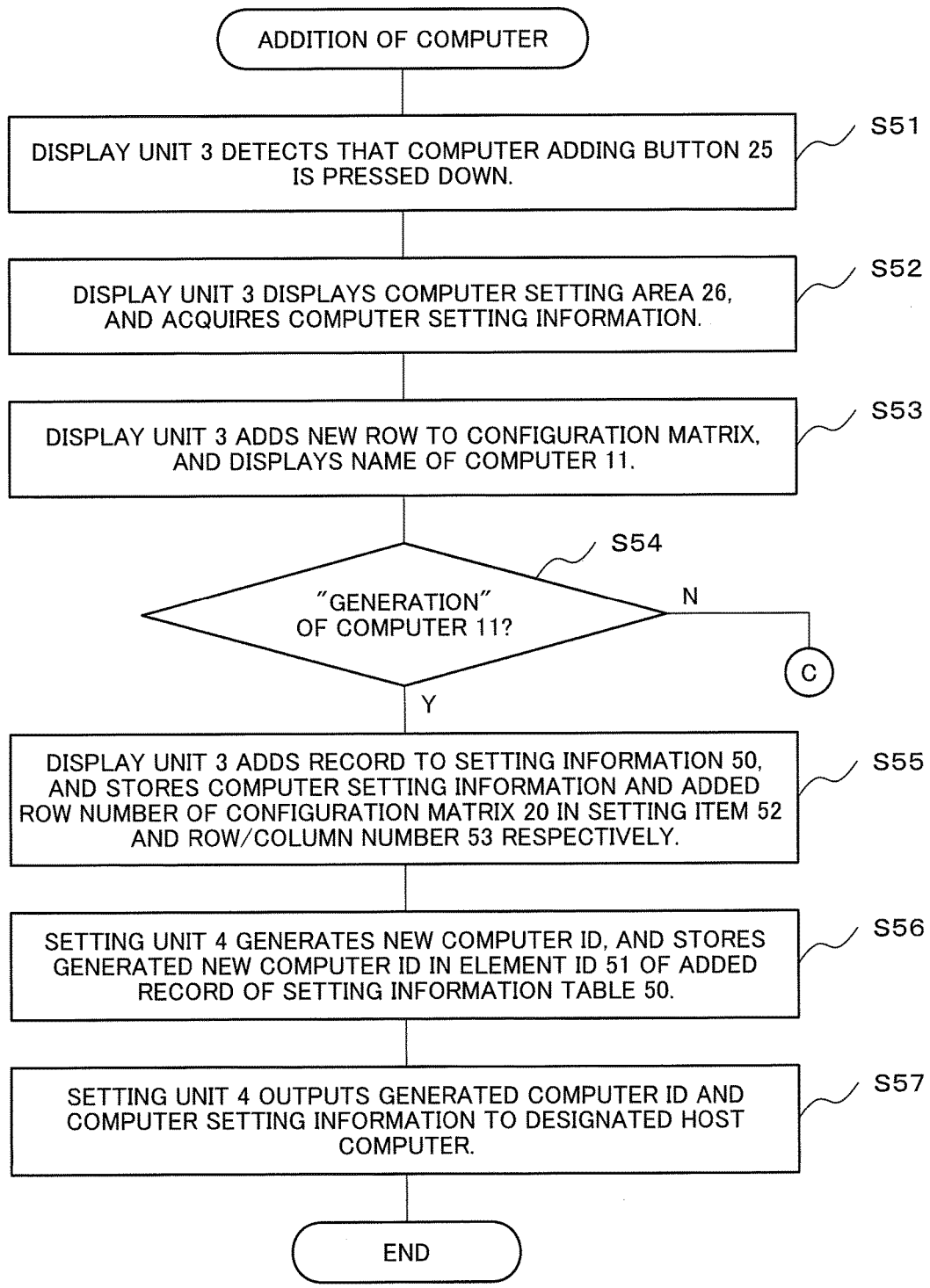
FIG. 11 is an operational flowchart (1/2) carried out when the display apparatus 1 adds a new computer 11.
Figure 12:
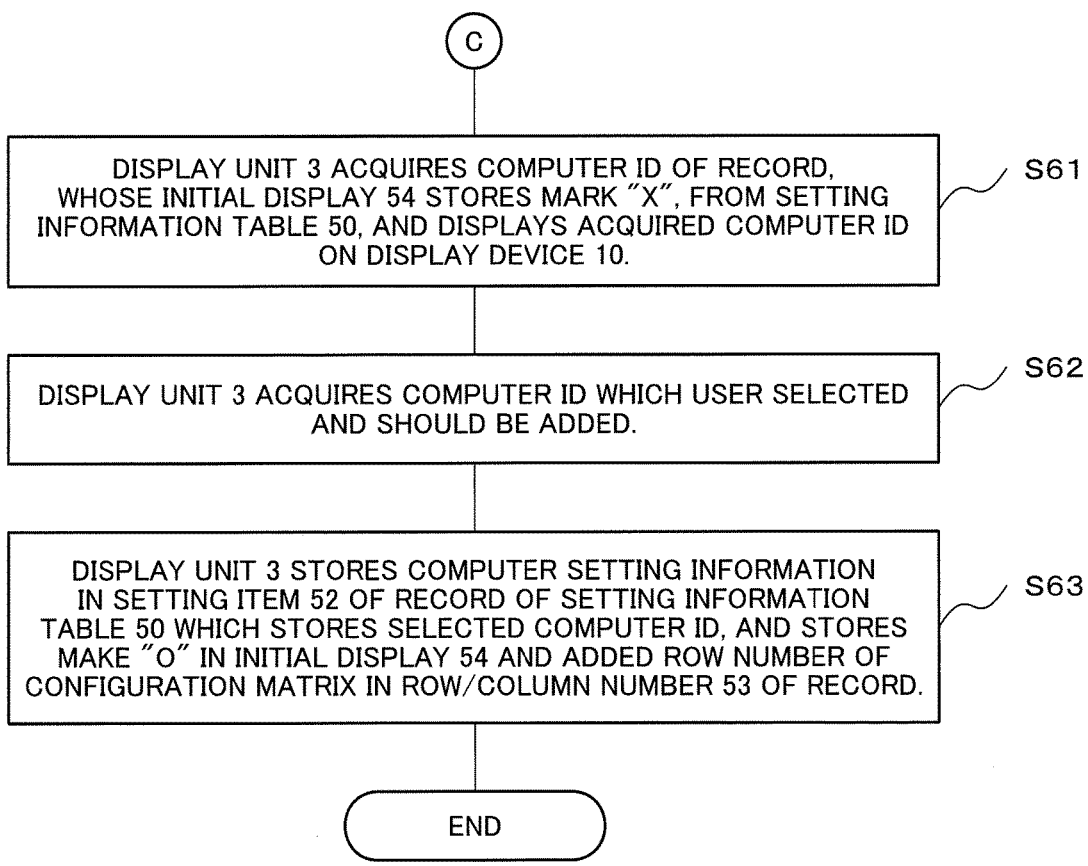
FIG. 12 is an operational flowchart (1/2) carried out when the display apparatus 1 adds the new computer 11.

FIG. 11 and FIG. 12 are an operational flowchart carried out when the display apparatus 1 adds a new computer 11. When the user presses down the computer adding button 25, the operation starts.

When the display unit 3 detects that the computer adding button 25 is pressed down (S51), the display unit 3 displays the computer setting area 26, and acquires the computer setting information, which the user inputs, from the computer setting area 26 (S52). The computer setting information includes the name of the computer, and the distinction between generating a new computer 11 (generation) and displaying the computer which is not displayed at this moment (display).

Here, "generation" is possible in the case that the computer 11 is a virtual computer. In this case, the virtual computer exists on a host computer which is a real computer not shown in FIG. 1. For example, the computers 11a to 11c exist on host computer a, and the computers 11d to 11e exist on host computer b, and the computers 11f and 11g exist on host computer c.

The display unit 3 adds a new row to the configuration matrix 20, and displays the name on the row (S53).

In the case that the distinction of the computer setting information is "generation" (Y in S54), the display unit 3 adds a record to the setting information table 50, and stores the computer setting information in the setting item 52, and stores the added row number of the configuration matrix 20 in the row/column number 53. The display unit 3 stores the mark "O" in the initial display 54 (S55).

In this case, the computer setting information includes designation of the host computer, designation of a device configuration of the virtual computer to be generated, and a port number of the switch 12 which is used by the virtual computer to be generated. The port of the switch 12, which is used by the virtual computer to be generated and which is connected with the host computer, has a port number which another virtual computer does not use.

The setting unit 4 generates a new computer ID and stores the new computer ID in the element ID 51 of the record which is added to the setting information table 50 (S56).

Finally, the setting unit 4 sends a virtual computer generating request, which includes the generated computer ID, the device configuration information on the virtual computer, and the port number of the switch 12 which the virtual computer uses, to the designated host computer (S57). When the virtual computer monitor of the host computer receives the virtual computer generating request, the virtual computer monitor generates the virtual computer which has the designated configuration, and uses the designated port used for communication of the virtual computer.

In the case that the distinction of computer setting information indicates "display" (N in S54), the display unit 3 acquires the computer IDs of the records, whose initial display 54 indicate the mark "X", from the setting information table 50, and displays the computer IDs on the display device 10 (S61). The display unit 3 displays, for example, the computer IDs in the computer setting area 26 in the form such as the pull-down menu. The user who sees the pull-down menu selects a computer which should be added.

The display unit 3 acquires the computer ID of the computer which the user selected (S62). The display unit 3 stores the computer setting information in the setting item 52 of the record, whose element ID 51 stores the computer ID of the selected computer, on the setting information table 50, and sets the mark "O" to the initial display 54 of the record. The display unit 3 stores the added column number of the configuration matrix 20 in the row/column number 53 of the record (S63).

Here, if necessary, the setting unit 4 sends a part of the computer setting information to the computer 11 which should be displayed. For example, in the case that the computer setting information includes designation to generate a new OS account, the setting unit 4 sends the information to the computer 11. The computer 11 generates the designated OS account.

Here, it may be preferable that the display unit 3 displays another icon instead of the network adding button 23 and the computer adding button 25. In this case, handling an icon is not limited to pressing down the icon.

According to the display apparatus 1, it is possible to grasp easily the computers 11 and the network(s), which are included in the communication system 15 including a plurality of computers 11, one or more than one switches 12 and VLAN(s) realized by the switch(es) 12, with no necessity to recognize detailed topology of the communication system 15.

The first reason is that the display unit 3 displays the configuration matrix 20 on the display device 10. The configuration matrix 20 indicates the topology information excluding information which the user does not need. For example, the user has no necessity to know that the network is VLAN, and to know the composition of the switch(es) 12.

Here, there is a method which displays a network connection between computers through drawing a line between the displayed computers. However, the method has a problem that, in the case of a large scale system, number of the lines for displaying the network connection becomes large, and consequently the displayed chart becomes complicate. According to the display apparatus 1 of the exemplary embodiment, it is possible to grasp the computers and the networks easily through displaying the state of the connection between the computers 11 and the networks by use of the configuration matrix 20, even in the case of the large scale system.

The second reason is that the display unit 3 does not display the computer 11 and VLAN whose initial displays 54 indicate the mark "X", which the user has no necessity to know, on the configuration matrix 20. Furthermore, the reason is that it is possible to add the network and the computer 11 to the configuration matrix 20 easily on the basis of necessity by use of the network adding button 23 and the computer adding button 25 and to display the configuration matrix 20 to which the network and the computer 11 are added.

Moreover, according to the display apparatus 1, it is possible to set the network connection between the computer 11 and the network easily. The reason is that it is possible to carry out the connection setting which includes setting up the connection or erasing the connection through the user's selecting the cell of the configuration matrix 20. The user can carry out setting the network information locally with focusing on the specific computer 11 and the specific network.

Moreover, according to the display apparatus 11, it is possible to add the new network and the new computer 11 easily. The reason is that the new network and the new computer 11 are generated easily by use of the network adding button 23 and the computer adding button 25, and are added to the configuration matrix 20 and are displayed on the configuration matrix 20.

Second Exemplary Embodiment

A second exemplary embodiment of the present invention will be described in the following. The second exemplary embodiment of the present invention uses the open flow network technology. While VLAN, which is realized by L2 switch (layer 2 switch) or the like, is used as the network according to the first exemplary embodiment, a virtual network, which is realized by an open flow controller and an open flow switch, is used according to the exemplary embodiment. While the computer 11 may be the real computer or the virtual computer, a case that the computer 11 is the virtual computer will be described in the following. Hereinafter, a difference between the exemplary embodiment and the first exemplary embodiment will be described mainly.

Figure 13:
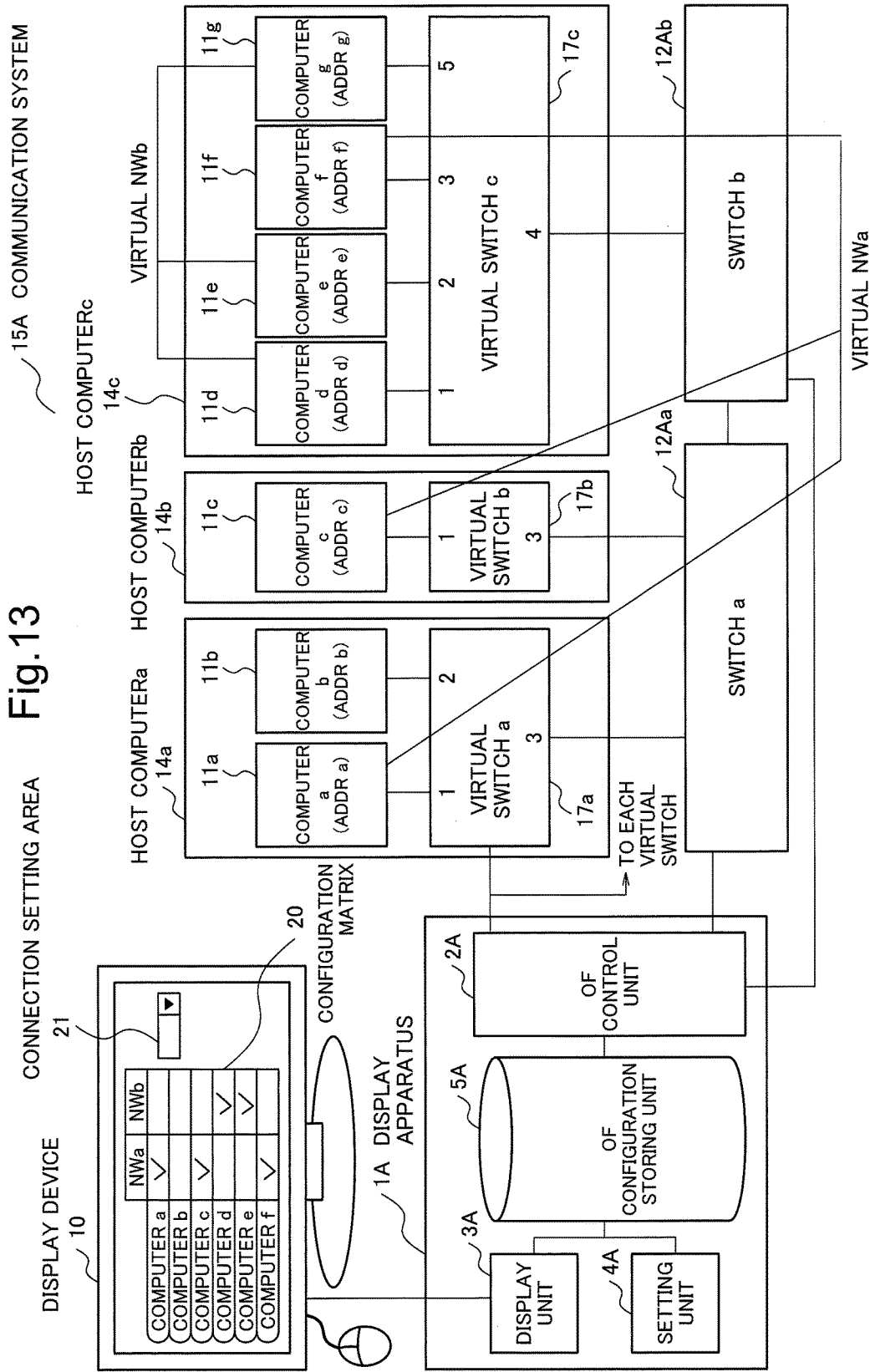
FIG. 13 shows an example of a configuration of a communication system 15A according to a second exemplary embodiment.

FIG. 13 shows an example of a configuration of a communication system 15A according to the second exemplary embodiment. The communication system 15A includes a display apparatus 1A, a plurality of host computers 14, one or more than one switches 12A each of which realizes a virtual network connecting the host computers each other, and the display device 10. The host computer 14 realizes the computers 11 which are one or more than one virtual computers, and one or more than one virtual switches 17.

The example of the communication system 15A shown in FIG. 13 includes three host computers 14 (host computers 14a to 14c). The host computer 14a realizes two computers 11 (computers 11a and 11b) and one virtual switch 17a virtually. The host computer 14b realizes one computer 11 (computer 11c) and one virtual switch 17b virtually. The host computer 14c realizes four computers 11 (computers 11d to 11g) and one virtual switch 17a virtually.

The switch 12A and the virtual switch 17, which are the open flow switch and the virtual open flow switch respectively, receive control information on the virtual network from the display apparatus 1A which functions also as a flow controller.

The switch 12 and the virtual switch 17 shown in FIG. 13 realize two virtual networks of virtual NWa and virtual NWb. Three computers of the computer 11a, the computer 11c and the computer 11f are connected with virtual NWa respectively. Three computers of the computer 11d, the computer 11e and the computer 11g are connected with virtual NWb respectively. The computers 11, which are connected with the same virtual network respectively, can communicate each other via the virtual network. Moreover, each of the computers 11a to 11g is assigned an address (ADDRa to ADDRg respectively) for communication. Here, an ADDR is, for example, an IP address, a MAC address or a port number of the virtual switch 17.

The display apparatus 1A includes a display unit 3A, a setting unit 4A, an OF configuration storing unit 5A and an OF control unit 2A. The OF configuration storing unit 5A stores the setting information table 50 and an OF control table 60 which shows a configuration including each computer 11 and each virtual network of the communication system 15A.

The display unit 3A acquires, for example, configuration information on each computer 11 and each virtual network, which are included in the communication system 15A, from the configuration storing unit 5A. It may be preferable that the display unit 3 makes an inquiry to each computer 11 and each switch 12, and acquire the configuration information. Then, the display unit 3A displays the configuration matrix 20 on the display device 10 on the basis of the acquired configuration information.

The setting unit 4A sets the connection between the computer 11 and the virtual network, which are corresponding to the cell designated by the user, on the basis of the connection setting information 40 acquired from the display unit 3A.

As the open flow controller, the OF control unit 2A carries out the following operation schematically.

In the case that one computer 11 (sending computer) requests to send to the other computer 11 (receiving computer), the virtual switch 17, which is connected with the sending computer 11, makes an inquiry on a destination of a communication frame to the OF control unit 2A. The OF control unit 2A judges whether two computers 11 (sending computer 11 and receiving computer 11) are connected with the same virtual network respectively with reference to the OF control table 60.

In the case that two computers 11 are connected with the same virtual network respectively, the OF control unit 2A sends flow table information, which indicates a destination of data, to each of the virtual switches 17 and the switches 12 which exist on a route from the sending computer 11 to the receiving computer 11. The virtual switches 17 and the switches 12, which receive the flow table information, set a flow table on the own apparatus on the basis of the information. Afterward, the virtual switches 17 and the switches 12A transfer the communication frame on the basis of the flow table and make the communication frame reach to the receiving computer 11. Until the OF control unit 2A issues an instruction for disconnection afterward, the virtual switches 17 and the switches 12A, which set the flow table, transfer the communication frame from the sending computer to the receiving computer.

Since the OF control unit 2A stores topology information on the virtual switches 17 and the switches 12A, the OF control unit 2A can select the virtual switches 17 and the switches 12A which exist on the route from the sending computer 11 to the receiving computer 11, and can send the flow table information correctly to each switch.

When the computer 11a, which is connected with the virtual NWa, sends data to the computer 11f in the example shown in FIG. 13, for example, the virtual switch 17a makes the above-mentioned inquiry to the OF control unit 2A. The OF control unit 2A, which receives the inquiry, calculates a transfer route, along which data is transferred from the computer 11a to the computer 11f, on the basis of the topology information which is related to the virtual switch 17 and the switch 12A and which the OF control unit 2A stores. According to the example shown in FIG. 13, a transfer route of the computer 11a→the virtual switch a→the switch a→the switch b→the virtual switch c→the computer 11f is calculated. In order to realize the calculated transfer route, the OF control unit 2A sends the flow table information, which describes a process to be carried out to a packet, to each virtual switch 17 and each switch which 12 exist on the transfer route.

Specifically, the OF control unit 2A sends the flow table information, which describes an instruction "to transfer a packet, whose source is the computer 11a and whose destination is the computer 11f, from a port connected with the switch a", to the virtual switch a. Moreover, the OF control unit 2A sends the flow table information, which describes an instruction "to transfer a packet, whose source is the computer 11a and whose destination is the computer 11f, from a port connected with the switch b", to the switch a. The OF control unit 2A sends the flow table information, which describes an instruction "to transfer a packet, whose source is the computer 11a and whose destination is the computer 11f, from a port connected with the virtual switch c", to the switch b. The OF control unit 2A sends the flow table information, which describes an instruction "to transfer a packet, whose source is the computer 11a and whose destination is the computer 11f, from a port connected with the computer 11f, to the virtual switch c.

Here, in the case that a certain computer 11 is separated from a certain virtual network on the OF control table 60, the OF control unit 2A instructs the corresponding virtual switches 17 and the corresponding switches 12A to erase the transfer data, which is related to the communication address of the separated computer 11, from the flow table.

FIG. 14 shows composition of the OF control table 60 which the OF configuration storing unit 5A stores. The OF control table 60 includes one or more than one records each of which includes a virtual network ID 61 and a computer address 62. The virtual network ID 61 is an identifier of the virtual network. The identifier of the virtual network is, "virtual NWa" or "virtual NWb" in FIG. 13.

The computer address 62 stores communication addresses of a plurality of computers 11 each of which is connected with the virtual network included in the record. The example of data shown in FIG. 14 shows the OF control table 60 which is corresponding to the example of the configuration shown in FIG. 13.

The composition of the setting information table 50, which the OF configuration storing unit 5A stores, is the same as one shown in FIG. 5. However, the element ID 51 stores not VLAN_ID such as VLANa, but the identifier of the virtual network such as the virtual NWa. Furthermore, the setting item 52 of the computer 11 includes the communication address.

Figure 15:
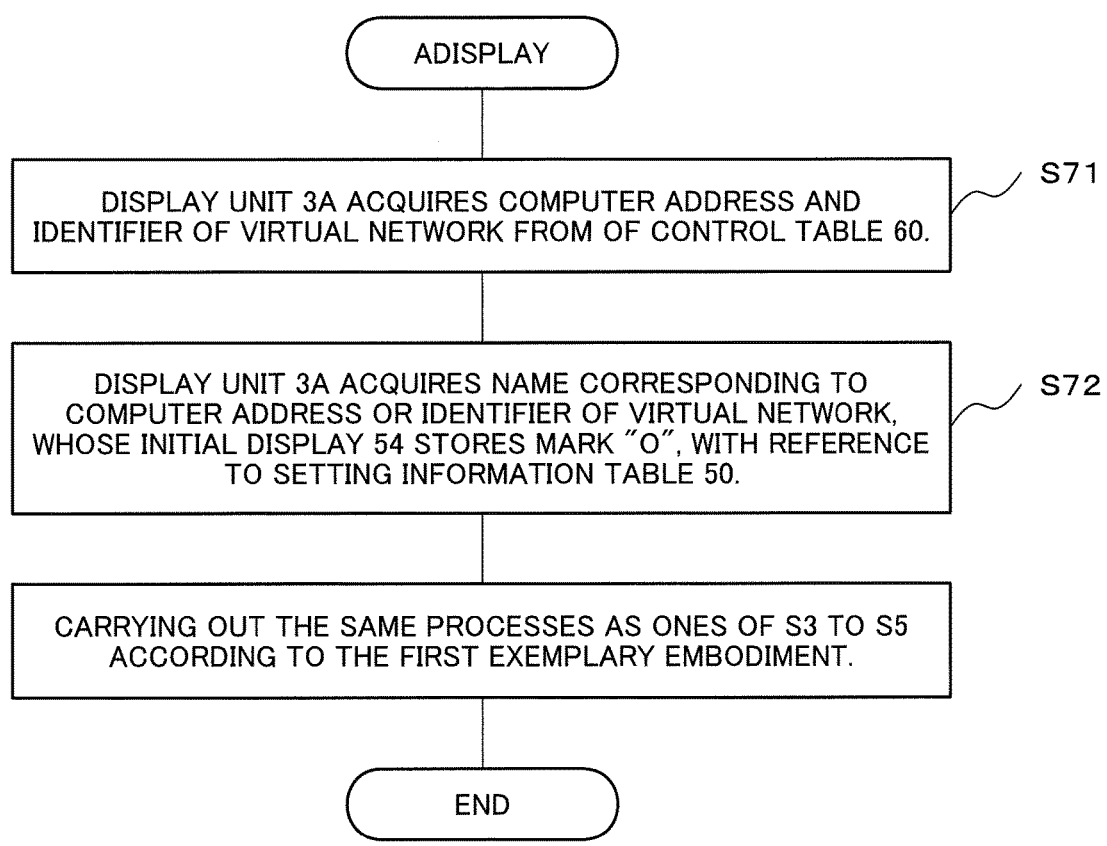
FIG. 15 is an operational flowchart carried out when a display apparatus 1A displays the configuration matrix 20 initially according to the second exemplary embodiment.

FIG. 15 is an operational flowchart carried out when the display apparatus 1A displays the configuration matrix 20 initially according to the second exemplary embodiment.

The display unit 3A acquires all computer addresses and all identifiers of the virtual networks from a column of the virtual network ID 61 and a column of the computer address 62 with reference to the OF control table 60 (S71). Next, the display unit 3A acquires the names corresponding to the computer addresses and the identifiers of the virtual networks, whose the initial display 54 indicate the mark "O", with reference to the setting information table 50 (S72).

The operation carried out afterward is the same as ones in S3 to S5 according to the first exemplary embodiment (FIG. 6). However, VLAN is replaced by the virtual network in S3 to S5.

Figure 16:
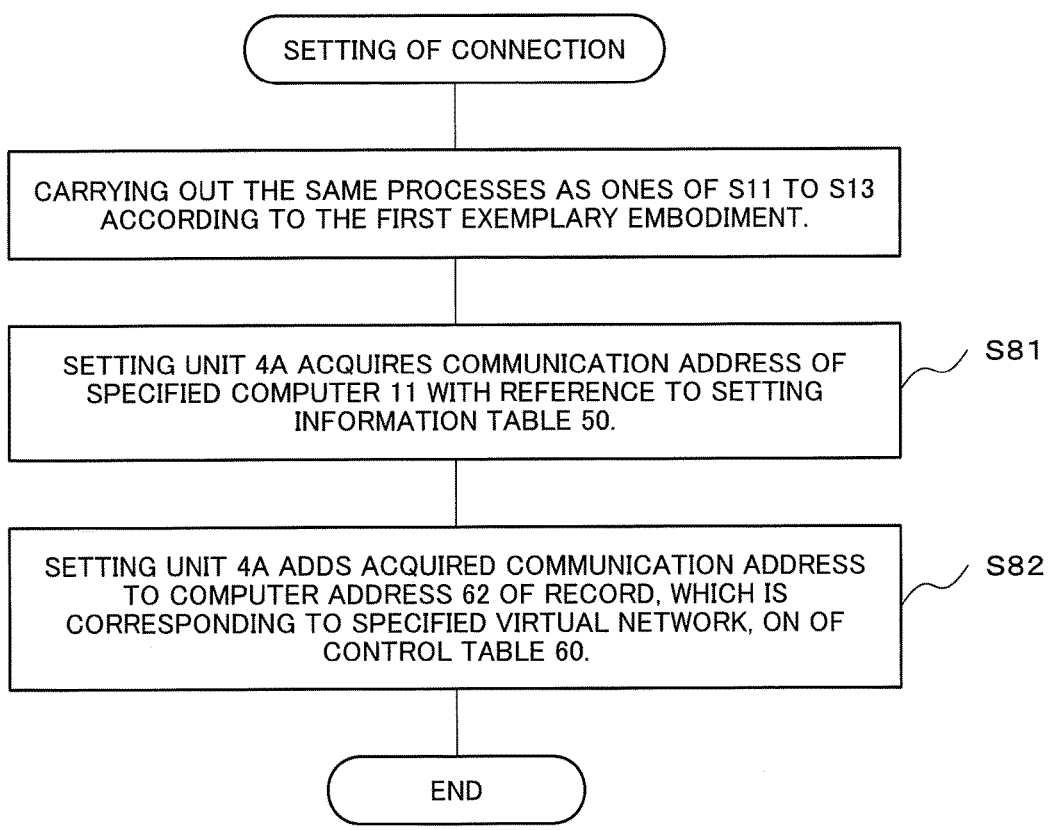
FIG. 16 is an operational flowchart carried out when the display apparatus 1A sets connection between the computer 11 and VLAN which are designated.

FIG. 16 is an operational flowchart carried out when the display apparatus 1A sets the connection between the computer 11 and the virtual network which are designated. Here, the flowchart shows a case that the type 41 of the connection setting information 40 indicates "connected state".

The first operation is the same as ones of S11 to S13 according to the first exemplary embodiment (FIG. 7). However, the display unit 3, the setting unit 4 and VLAN are replaced by the display unit 3A, the setting unit 4A and the virtual network respectively in S11 to S13.

Afterward, the setting unit 4A acquires the communication address of the specified computer 11 with reference to the setting information table 50 (S81). The setting unit 4A adds the acquired communication address to the computer address 62 of the record, which is corresponding to the specified virtual network, on the OF control table 60 (S82).

Here, in the case that the type 41 of the connection setting information 40 indicates "not-connected state", the setting unit 4A erases the communication address of the specified computer 11 from the computer address 62 of the record, which is corresponding to the specified virtual network, on the OF control table 60. It may be preferable that the setting unit 4A informs the OF control unit 2A of the erasure. In this case, the OF control unit 2A instructs the corresponding virtual switches 17 and the corresponding switches 12A to erase the transfer data, which is related to the communication address of the disconnected computer 11, from the flow table.

An operational flowchart, which is carried out when the display apparatus 1A adds a new network, is the same as one according to the first exemplary embodiment (FIG. 9 and FIG. 10). However, the display unit 3, the setting unit 4 and VLAN are replaced by the display unit 3A, the setting unit 4A and the virtual network respectively. Moreover, instead of carrying out S37 shown in FIG. 9, the setting unit 4A adds a new record to the OF control table 60 and adds an identifier of the generated virtual network to the virtual network ID 61 of the added record.

Here, the setting unit 4A sends information, which causes an influence on a work of the switch 12A, such as the limitation value of an amount of flow, and the designation of the protocol filter out of the network setting information to the OF control unit 2A. The OF control unit 2A receives the network setting information and reflects the received network setting information to the attribute of the virtual network. For example, the setting unit 4A sets the limitation value of an amount of flow to a condition part (Header Fields) of the flow table.

An operational flowchart, which is carried out when the display apparatus 1A adds a new computer 11, is the same as one according to the first exemplary embodiment (FIG. 11 and FIG. 12). Here, in the case of "generation" of the computer 11, the user inputs computer setting information, which includes an identifier of the host computer 14, an identifier of the virtual switch 17, a port number, device configuration designation of the virtual computer to be generated, and a communication address (IP address or the like), by use of the computer setting area 26. Then, in S57 of FIG. 11, the setting unit 4 sends a virtual computer generating request, which includes the generated computer ID, device configuration information on the virtual computer, and the communication address, to the designated host computer 14. For example, the virtual computer monitor (not shown in the figure) in the host computer 14 generates the virtual computer on the basis of the virtual computer generating request.

Here, it may be preferable in the exemplary embodiment that an apparatus different from the display apparatus 1A is equipped with the OF control unit 2A.

Moreover, it may be preferable that the communication system 15A does not include the virtual switches 17. In this case, for example, one computer 14 is connected with a plurality of ports of the switches 12A, and one computer 11 which exists in the computer 14 occupies the port different from the port which the other computer 11 occupies.

In the communication system 15A which includes the open flow controller, a plurality of the computers 11, one or more than one switches 12A which are open flow switches, and the virtual networks realized by the switches 12A, the display apparatus 1A according to the exemplary embodiment has the same effect as the display apparatus 1 according to the first exemplary embodiment has. The reason is that the display apparatus 1A absorbs a difference between VLAN and the open flow, and provides the GUI based on the configuration matrix 20.

Third Exemplary Embodiment

A third exemplary embodiment of the present invention will be described in the following. While the network realized by the switch 12 is used according to the first and the second exemplary embodiments, a virtual network realized by VMM (Virtual Machine Monitor) is used according to the third exemplary embodiment. The computer 11 according to the exemplary embodiment is a virtual computer. Hereinafter, a difference between the exemplary embodiment and the first exemplary embodiment will be described mainly.

Figure 17:
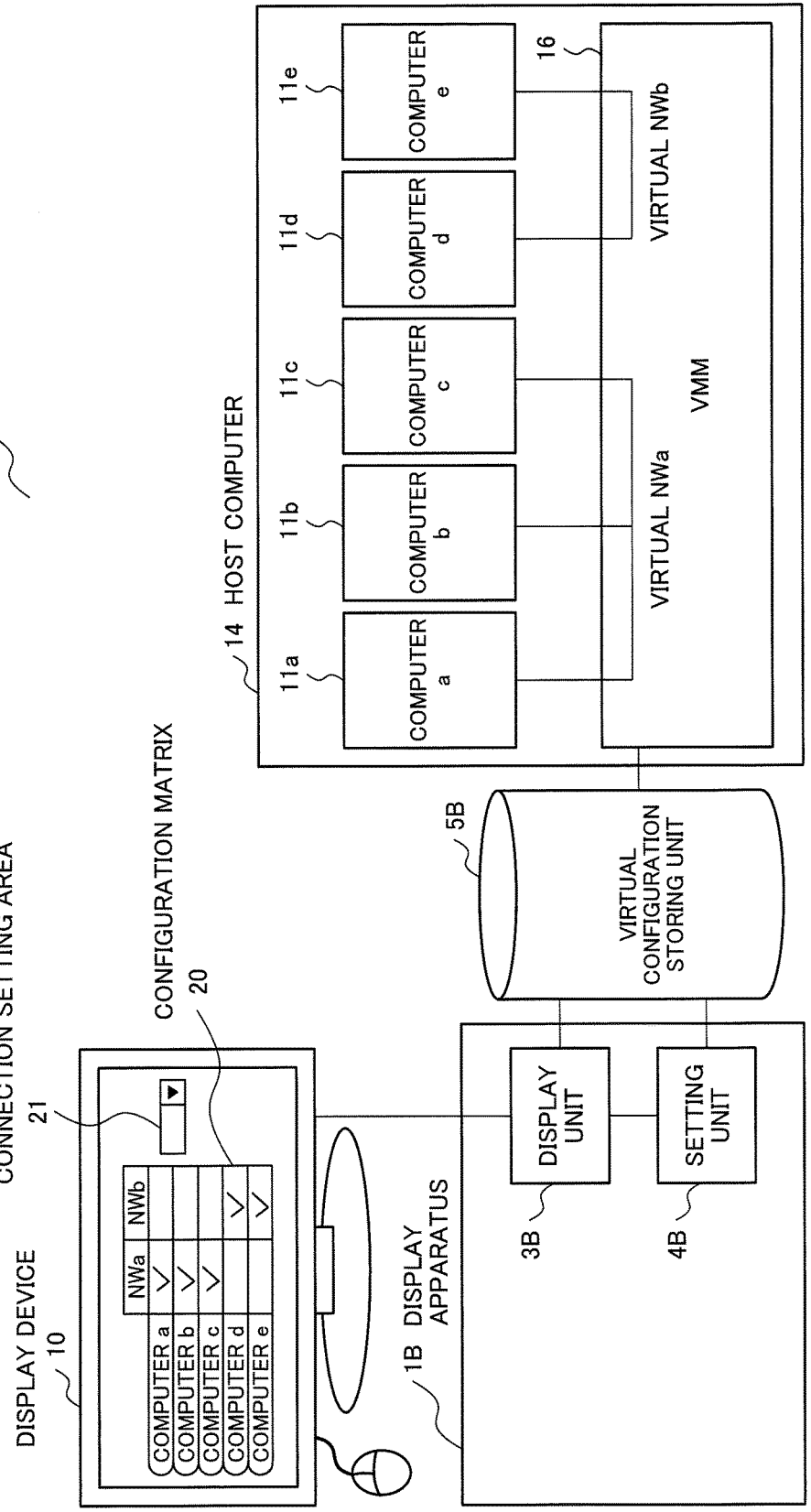
FIG. 17 shows an example of a configuration of a communication system 15B according to a third exemplary embodiment.

FIG. 17 shows an example of a configuration of a communication system 15B according to the third exemplary embodiment of the present invention. The communication system 15B includes a display apparatus 1B, one or more than one host computers 14, a virtual configuration storing unit 5B and the display device 10. By use of VMM 16, the host computer 14 realizes the computer 11 which is the virtual computer, and the virtual network which connects the computers 11 each other.

According to the example of the communication system 15B shown in FIG. 13, the host computer 14 realizes five computers 11 (computers 11a to 11e) and two virtual networks (virtual NWa, and virtual NWb) virtually.

Three computers of the computer 11a, the computer 11b and the computer 11c are connected with the virtual NWa respectively. Two computers of the computer 11d and the computer 11e are connected with the virtual NWb respectively. The computers 11, which are connected with the same virtual network respectively, can communicate each other via the virtual network. According to the exemplary embodiment, VMM 16 makes the computers 11 communicate each other through copying a communication frame within a memory of the host computer 14 by use of the inter-process communication function.

Here, if both of the display apparatus 1B and the host computer 14 can access the virtual configuration storing unit 5B, it may be preferable that either the display apparatus 1B or the host computer 14 includes the virtual configuration storing unit 5B. The virtual configuration storing unit 5B stores the setting information table 50 and a virtual configuration table 70 which shows a configuration including each computer 11 and each virtual network of the communication system 15B.

FIG. 18 shows composition of the virtual configuration table 70 which the virtual configuration storing unit 5B stores. The virtual configuration table 70 is a matrix whose row is corresponding to a virtual network ID 71 and whose column is corresponding to a computer ID 72. The virtual network ID 71 is an identifier of the virtual network. The identifier of the virtual network is, for example, "NWa" or "NWb" in FIG. 18.

The computer ID 72 is an identifier of the computer 11. The identifier of the computer 11 is, for example, "computer a" or "computer b" in FIG. 18.

The virtual configuration table 70 stores the connection setting information 40 in a cell at which a row and a column cross each other The connection setting information 40 describes the connection between the virtual network corresponding to the row, and the computer 11 corresponding to the column. That is, each cell stores information which indicates that the connection between the computer 11 and the virtual network exists (mark O is indicated in FIG. 18) or does not exist (mark X is indicated in FIG. 18). Furthermore each cell stores the connection designation 42. The example of data in FIG. 18 shows the virtual configuration table 70 corresponding to the example of the configuration shown in FIG. 17.

Composition of the setting information table 50, stored in the virtual configuration storing unit 5B is the same as one shown in FIG. 5. However, the element ID 51 stores not VLAN_ID but the identifier of the virtual network such as the NWa. Any record corresponding to the computers f and g does not exist through reflecting the configuration shown in FIG. 17.

The VMM 16 of the host computer 14 allows the computers 11, which are connected with the same virtual network respectively on the virtual configuration table 70, to communicate each other. On the other hand, the VMM 16 terminates the communication between the computers 11, which are not connected with the same virtual network respectively, abnormally. That is, the VVM 16 terminates abnormally, for example, a connection request which the computer 11 issues.

Furthermore, when the VMM 16 makes the computers 11 communicate each other, VMM determines characteristics of the communication with reference to the connection designation 42 on the connection between the both computers 11 and the virtual network which are stored in the virtual configuration table 70, and the setting item 52 of the setting information table 50.

For example, when the VMM 16 receives a communication request for communication of the computer 11a with the computer 11b, the VMM 16 judges that two computers 11 are connected with NWa respectively with reference to the virtual configuration table 70 shown in FIG. 18, and makes the computer 11a communicate with the computer 11b. A communication request for communication of the computer 11a with the computer 11c is also processed similarly. However, the VMM 16 makes a communication request for communication of the computer 11a with the computer 11d terminated abnormally, since the computer d is not connected with NWa.

Moreover, in the virtual configuration table 70, in the case that the connection designation 42 on the connection between NWa and the computer c includes designation of the protocol filter of HTTP, and the connection designation 42 on the connection between NWa and the computers a and b does not include the above-mentioned designation, VMM 16 transfers HTTP data, which the VMM 16 receives from the computer 11a, to the computer b, but does not transfer the HTTP data to the computer c. Moreover, in the case that the setting information 52 on NWa includes the designation of the protocol filter of HTTP, the VMM 16 does not transfer the HTTP data, which the VMM 16 receives from the computer 11a, even to the computer b.

The display apparatus 1B includes a display unit 3B and a setting unit 4B.

The display unit 3B acquires, for example, information on the configuration, which includes each computer 11 and each virtual network of the communication system 15B, from the virtual configuration storing unit 5B. It may be preferable that the display unit 3 makes an inquiry to the VMM 16 of the host computer 14, and acquires the configuration information from the VMM 16. Furthermore, the display unit 3B displays the configuration matrix 20 on the display device 10 on the basis of the acquired configuration information.

The setting unit 4B sets the connection between the computer 11 and the virtual network, which are corresponding to the cell designated by the user, on the basis of the connection setting information 40 acquired from the display unit 3.

FIG. 6 is an operational flowchart carried out when the display apparatus 1B displays the configuration matrix 20 initially according to the third exemplary embodiment. However, the display unit 3, the configuration table 30 and VLAN are replaced by the display unit 3B, the virtual configuration table 70 and the virtual network respectively.

Figure 19:
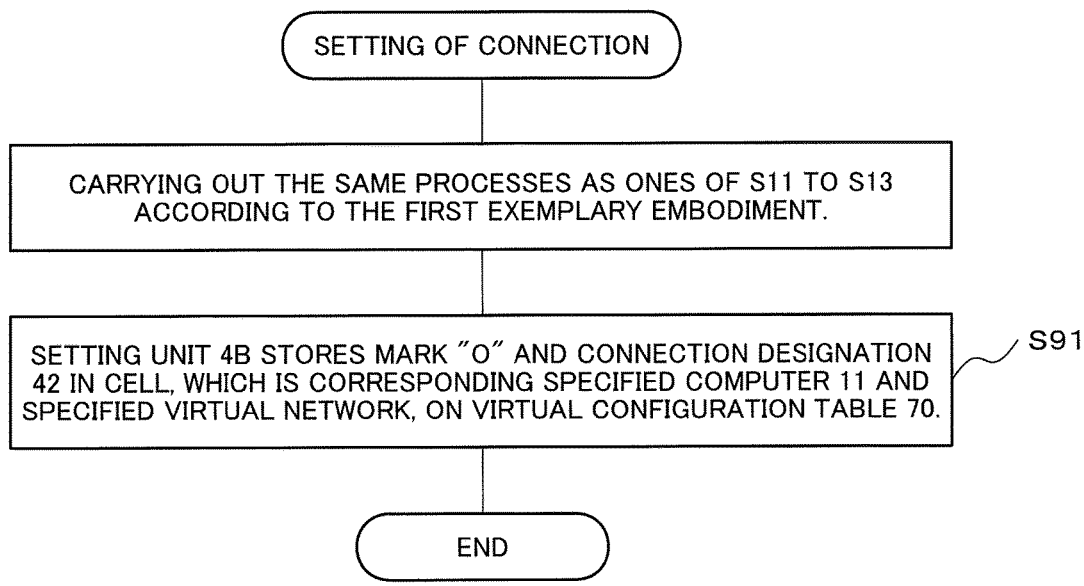
FIG. 19 is an operational flowchart carried out when a display apparatus 1B sets connection between the computer 11 and VLAN which are designated.

FIG. 19 is an operational flowchart carried out when the display apparatus 1B sets the connection between the computer 11 and the virtual network which are designated. Here, the flowchart shows a case that the type 41 of the connection setting information 40 indicates "connected state".

An operation until specifying the designated computer 11 and the designated virtual network is the same as one of S11 to S13 according to the first exemplary embodiment (FIG. 7). However, the display unit 3, the setting unit 4 and VLAN are replaced by the display unit 3B, the setting unit 4B and the virtual network respectively.

Afterward, the setting unit 4B stores the mark "O", and the connection designation 42 of the connection setting information 40 in the cell, which is corresponding to the specified computer 11 and the specified virtual network, on the virtual configuration table 70 (S91).

Here, in the case that the type 41 of the connection setting information 40 indicates "not-connected state", the setting unit 4B stores the mark "X" in the cell, which is corresponding to the specified computer 11 and the specified virtual network, on the virtual configuration table 70.

An operational flowchart, which is carried out when the display apparatus 1B adds a new network, is the same as ones according to the first exemplary embodiment (FIG. 9 and FIG. 10). However, the display unit 3, the setting unit 4 and VLAN are replaced by the display unit 3B, the setting unit 4B and the virtual network respectively. Moreover, instead of carrying out S37 of FIG. 9, the setting unit 4B adds a new row to the virtual configuration table 70 and add an identifier of the new network to the virtual network ID 71 of the added row.

An operational flowchart, which is carried out when the display apparatus 1B adds a new computer 11, is the same as one according to the first exemplary embodiment (FIG. 11 and FIG. 12). However, the display unit 3 and the setting unit 4 are replaced by the display unit 3B and the setting unit 4B respectively.

Here, in the case of "generation" of the computer 11, the user inputs computer setting information, which includes the identifier of the host computer 14, the device configuration designation of the virtual computer to be generated, and the communication address (IP address or the like), by use of the computer setting area 26. Then, in S57 of FIG. 11, the setting unit 4 sends a virtual computer generating request, which includes the generated computer ID, the device configuration of the virtual computer and the communication address, to the designated host computer 14. The VMM 16 generates the virtual computer on the host computer 14 on the basis of the virtual computer generating request.

In the communication system 15B which includes the virtual network realized by the VMM 16, the display apparatus 1B according to the exemplary embodiment has the same effect as the display apparatus 1 according to the first exemplary embodiment has. The reason is that the display apparatus 1B absorbs a difference between VLAN and the virtual network, and provides the GUI based on the configuration matrix 20.

Here, it may be preferable that the display apparatus 1B and the host computer 14 are mounted on one apparatus in the exemplary embodiment.

Fourth Exemplary Embodiment

A fourth exemplary embodiment of the present invention will be described in the following. According to the exemplary embodiment, the display unit 3 of the display apparatus 1 displays a modified configuration matrix 20A instead of the configuration matrix 20. The display unit 3 generates the modified configuration matrix 20 through making one row include a plurality of computers 11 which do not share the network, and displays the modified configuration matrix 20A.

Figure 20:
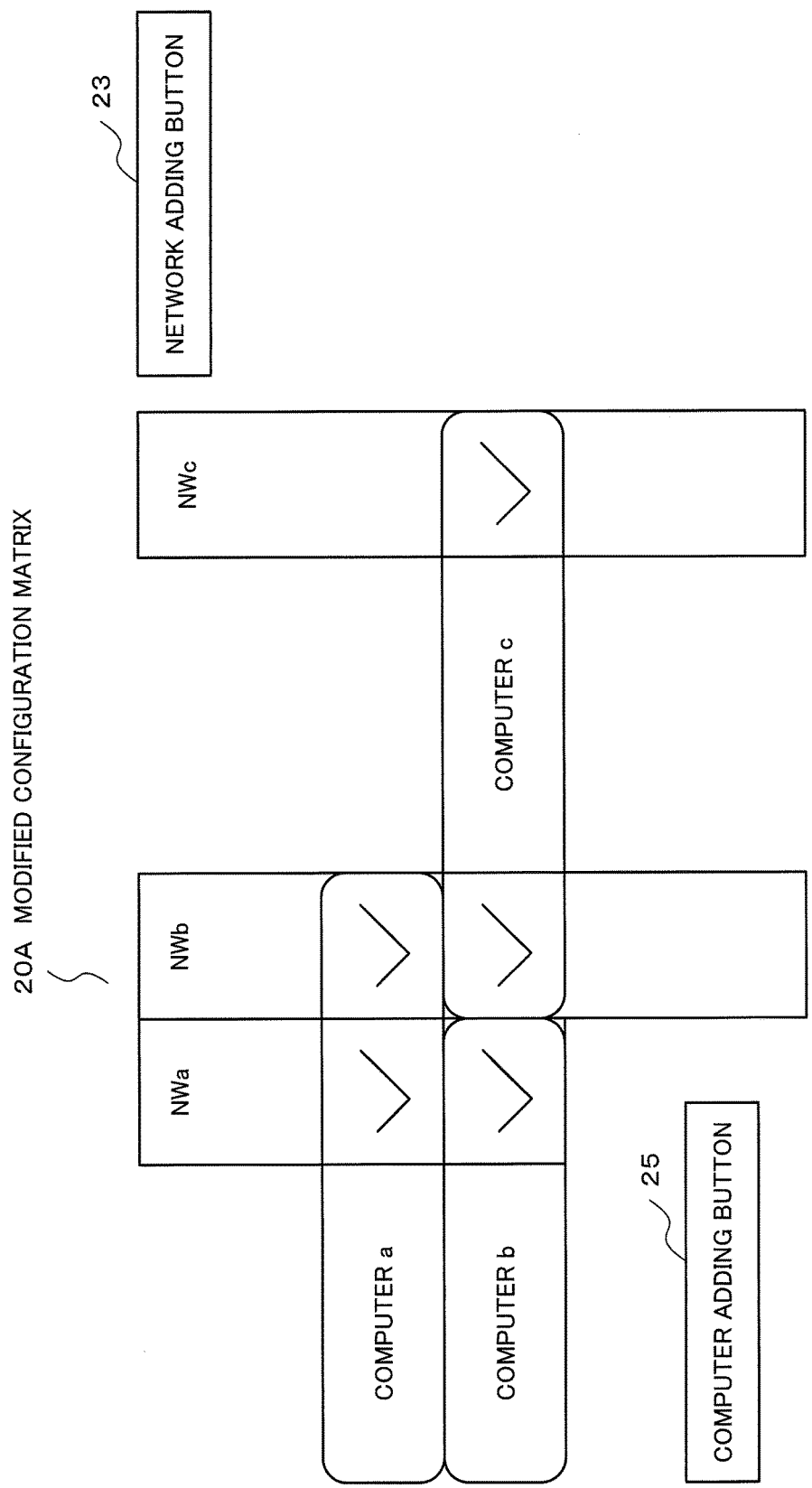
FIG. 20 shows an example of a modified configuration matrix 20A.

FIG. 20 shows an example of the modified configuration matrix 20A. The modified configuration matrix 20A indicates the communication system 15 including three computers 11 (computer a to computer c) and three networks (NWa to NWc).

The computer a is connected with two networks of NWa and NWb. The computer b is connected with NWa. The computer c is connected with two networks of NWb and NWc. Accordingly, the computer b and the computer c are not connected with the same network. In this case, the computer b and the computer c are displayed in the same row of the modified configuration matrix 20A.

Moreover, the display unit 3 arranges the columns corresponding to the networks, with which one computer 11 is connected commonly, at positions adjacent each other as far as possible. Since the computer a is connected with NWa and NWb in FIG. 20, the display unit 3 displays NWa and NWb in the columns adjacent each other in the modified configuration matrix 20A. The display unit 3 displays also NWb and NWc, with which the computer b is connected, in the columns adjacent each other.

It may be preferable that the display unit 3 displays not only the modified configuration matrix 20A but also the network adding button 23 and the computer adding button 25. In this case, when the display unit 3 detects that the network adding button 23 or the computer adding button 25 is pressed down, the display unit 3 modifies the configuration matrix 20 into the modified configuration matrix 20A to add the row or the column.

It is possible to combine the exemplary embodiment with any one of the first to the third exemplary embodiments.

Moreover, it may be preferable that the display unit 3 generates the modified configuration matrix 20A through making one column include a plurality of the networks which do not share the computer, and displays the modified configuration matrix 20A.

According to the display apparatus 1 of the exemplary embodiment, it is possible to display the configuration of the communication system 15 by use of smaller number of the rows or the columns in comparison with the case of displaying the configuration of the communication system 15 by use of the configuration matrix 20. Accordingly, it is possible that the display unit 3 displays all computers 11 and all networks of the communication system 15 on only one screen. Even if it is impossible to display all computers 11 and all networks on one screen, it is possible that the display unit 3 displays all computers 11 and all networks of the communication system 15 with a small amount of scroll. As a result, the user can grasp the computer 11 and the network, which exist in the communication system 15, with ease.

The reason is that the display unit 3 makes one row include a plurality of the computers 11 which do not share the network, and displays the modified configuration matrix 20A which includes the row, or the display unit 3 makes one column include a plurality of the columns which do not share the computer 11, and displays the modified configuration matrix 20A which includes the column.

Fifth Exemplary Embodiment

Figure 21:
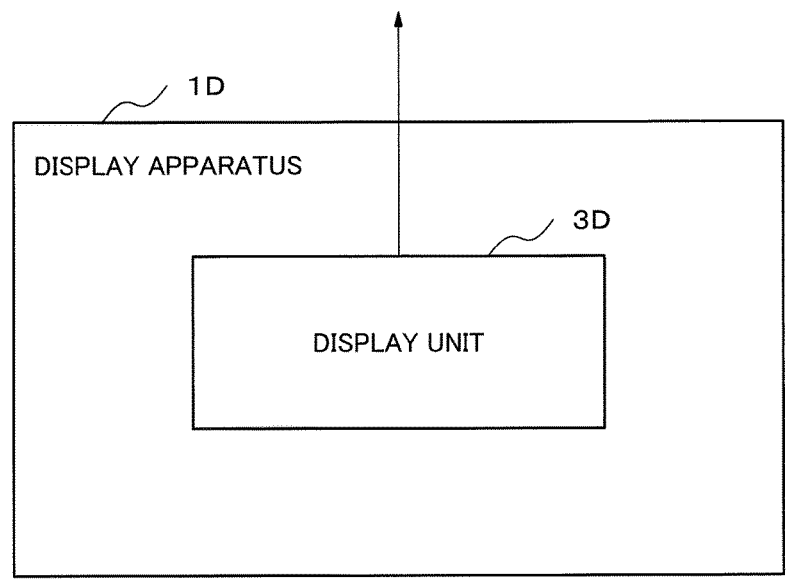
FIG. 21 shows an example of a configuration of a display apparatus 1D according to a fifth exemplary embodiment.

A fifth exemplary embodiment of the present invention will be described in the following. FIG. 21 shows an example of a configuration of a display apparatus 1D according to the fifth exemplary embodiment of the present invention. The display apparatus 1D includes a display unit 3D which displays information on the communication system 15, which includes a plurality of computers 11 and one or more than one networks connecting the computers each other, on a screen of the display device 10.

The display unit 3D displays identifiers of the computers 11, and identifiers of the networks, and furthermore displays a state of connection between the computer 11 and the network at a position, which is determined on the basis of the computer 11 and the network, on the screen of the display device 10.

According to the display apparatus 1D of the exemplary embodiment, it is possible for users to grasp easily the computers 11 and the networks connecting the computers 11 each other, which exist in the communication system 15 or the like, with no necessity of recognizing detailed topology.

The reason is that the display unit 3D displays the configuration matrix 20 on the display device 10.

While the invention according to the present application has been described with reference to the exemplary embodiments, the invention according to the present application is not limited to the above-mentioned exemplary embodiments. It is possible to make various changes, which a person skilled in the art can understand, in the composition and the details of the invention according to the present application without departing from the scope of the invention according to the present application.

For example, it may be preferable that the display unit 3 displays another system resource besides the computer 11 in the configuration matrix 20. The system resource means a resource on the system. For example, a computer, a virtual computer, an application program and a storage device are exemplified as the system resource.

Figure 22:
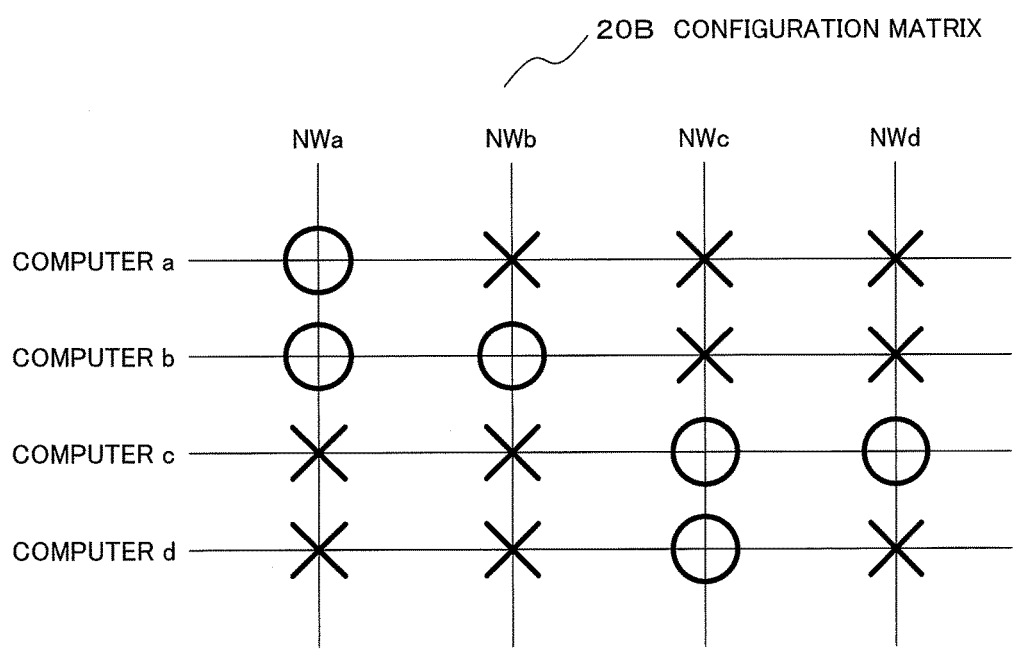
FIG. 22 shows an example of a configuration matrix 20B in a form of grid.

Furthermore, it may be preferable that, as the configuration matrix 20, the display unit 3 displays a grid which is obtained through converting the row and the column into a line having no width. In this case, it may be preferable that, on a crossing point of the grid, the display unit 3 displays the information on the connection between the computer 11 corresponding to the crossing point of the grid and the network corresponding to the crossing point. FIG. 22 shows an example of a configuration matrix 20B which is in a form of grid. The mark "O" or the mark "X", which is indicated at each crossing point, means the connected state or the disconnected state respectively.

Furthermore, it may be preferable that the display unit 3, for example, arranges and displays the identifiers of the computer, in a first direction, and arranges and displays the identifiers of the network, in a second direction different from the first direction, and displays the state of the connection between the computer and the network at a position which is determined on the basis of the displayed identifiers of the computer, and the displayed identifiers of the network.

Moreover, it may be preferable that the display apparatus 11 or the like, for example, does not include the setting unit 4. In this case, the display apparatus 11 merely displays the configuration matrix 20.

The present invention provides the GUI which, in the system including a plurality of the computers and the network connecting the computers each other, can make it easy for users to grasp the computer and the network, which exist in the system, with no necessity of recognizing the detailed topology.

The previous description of embodiments is provided to enable a person skilled in the art to make and use the present invention. Moreover, various modifications to these exemplary embodiments will be readily apparent to those skilled in the art, and the generic principles and specific examples defined herein may be applied to other embodiments without the use of inventive faculty. Therefore, the present invention is not intended to be limited to the exemplary embodiments described herein but is to be accorded the widest scope as defined by the limitations of the claims and equivalents.

Further, it is noted that the inventor's intent is to retain all equivalents of the claimed invention even if the claims are amended during prosecution.

What is claimed is:
1. An apparatus, comprising:
a processor configured to execute:
a display unit which displays information corresponding to a system on a screen of a display device, said system including a plurality of system resources and one or more networks connecting said system resources,
wherein said display unit displays a plurality of system resource identifiers which identify said plurality of system resources respectively and one or more network identifiers which identify said one or more networks respectively, and displays a state of connection between one of said system resources and one of said one or more networks at a position which is determined on the basis of a position at which the system resource identifier corresponding to the one of said system resources is displayed and a position at which the network identifier corresponding to the one of said one or more networks is displayed, and
wherein said display unit receives an input to designate a connection between one of said plurality of said system resources and one of said one or more networks in said system at an operation position on said screen, said operation position corresponding to the position which said state of connection is displayed; and
a setting unit which sets connection between one of said plurality of system resources identified by one of said plurality of system resource identifiers displayed at a position corresponding to said operation position and one of said one or more networks identified by one of said one or more network identifiers displayed at the position corresponding to said operation position.

2. The apparatus according to claim 1, wherein
said display unit displays a two-dimensional matrix with said system resource identifiers in either one of a row and a column of said matrix, and said network identifiers in the other of said row and said column; and wherein
said setting unit sets connection between one of said plurality of system resources identified by one of said plurality of system resource identifiers displayed at either one of a row and a column of said matrix corresponding to said operation position and one of said one or more networks identified by one of said one or more network identifiers displayed at the other of said row and said column corresponding to said operation position.

3. The apparatus according to claim 2, wherein
said display unit displays furthermore a network adding icon on said screen of said display device, and in response to detecting that said network adding icon is handled, adds either of a new column and a new row, corresponding to a new network to said matrix and displays said matrix, and
said setting unit generates said new network when said network adding icon is handled.

4. The apparatus according to claim 2, wherein
said display unit displays furthermore a network adding icon on said screen of said display device, and in response to detecting that said network adding icon is handled, acquires one of said one or more network identifiers identifying a hidden network which is one of the one or more networks included in said system and not displayed on said screen, and adds either of a new column and a new row, which is corresponding to said hidden network to said matrix, and displays said matrix.

5. The apparatus according to claim 2, wherein
at least one of said system resources is a virtual computer,
said display unit displays furthermore a computer adding icon on said screen of said display device, and in response to detecting that said computer adding icon is handled, adds either of a new row and a new column, which is corresponding to a new virtual computer to said matrix, and displays said matrix, and
said setting unit generates said new virtual computer when said computer adding icon is handled.

6. The apparatus according to claim 2, wherein
at least one of said system resources is a computer which is either of a real computer and a virtual computer,
said display unit displays furthermore a computer adding icon on said screen of said display device, and in response to detecting that said computer adding icon is handled, acquires one of said system resource identifiers identifying a hidden computer, which is said computer included in said system and not displayed on said screen, and adds either of a new row and a new column, which is corresponding to said new computer to said matrix, and displays said matrix.

7. The apparatus according to claim 2, wherein
said display unit acquires information regarding connection among said networks and system resources, selects two system resources, a first system resource and a second system resource, which are not connected to same one of said networks, arranges said network identifiers, along a first axis of a two-dimensional coordinate system defined on said screen, and said system resource identifiers, along a second axis of said two-dimensional coordinate system, while placing said system resource identifiers of said first system resource and said second system resource at the same row or column on said second axis.

8. The apparatus according to claim 3, wherein
at least one of said system resources is a computer which is either of a real computer and a virtual computer, at least one of said networks is a VLAN, said system includes one or more than one switches each of which has a plurality of ports and realizes said VLAN connecting designated said ports to each other, each of said plural computers is connected with any one of said ports, and wherein
said setting unit acquires connection setting information including an instruction for connecting or disconnecting a selected computer and a selected network to each other, said selected computer being one of said computer identified by one of said plurality of system resource identifiers displayed at a position corresponding to said operation position, and said selected network being one of said networks identified by one of said one or more network identifiers displayed at a position corresponding to said operation position, and sets said state of connection between said selected computer and said selected network on the basis of said connection setting information, and wherein
said setting unit, a) if said connection setting information includes said instruction for connection, issues an instruction to said switch to make said port, with which said selected computer is connected, included in said VLAN which is said selected network, b) if said connection setting information includes said instruction for disconnection, issues an instruction to said switch to make said port, with which said selected computer is connected, erased from said VLAN which is said selected network, and, c) when said network adding icon is handled, generates new definition information on said VLAN, and outputs said new definition information to said switch.

9. The apparatus according to claim 3, wherein
at least one of said system resources is a computer which is either of a real computer and a virtual computer, and said system includes one or more than one open flow switches each of which realizes at least one of said networks, and each of said plural computers is connected with any one of said open flow switches,
said apparatus includes furthermore an OF configuration storing unit which stores an OF control table indicating connection between said computers and said networks, and an open flow controller which sends flow table information to said open flow switches so as to enable communication between said computers which are connected with the same said network respectively on said OF control table, and wherein
said setting unit acquires connection setting information including an instruction for connecting or disconnecting a selected computer and a selected network to each other, said selected computer being one of said computer identified by one of said plurality of system resource identifiers displayed at a position corresponding to said operation position, and said selected network being one of said networks identified by one of said one or more network identifiers displayed at a position corresponding to said operation position, and sets said state of connection between said selected computer and said selected network on the basis of said connection setting information, and wherein
said setting unit, a) if said connection setting information includes said instruction for connection, adds connection between said selected computer and said selected network to said OF control table, b) if said connection setting information includes said instruction for disconnection, erases connection between said selected computer and said selected network from said OF control table, and c) when said network adding icon is handled, registers said new network in said OF control table.

10. The apparatus according to claim 3, wherein
said system resources are virtual computers realized by a virtual computer monitor running on said apparatus, and said networks are virtual networks realized by said virtual computer monitor,
said apparatus includes furthermore a virtual configuration storing unit storing a virtual configuration table indicating connection between said virtual computers and said virtual networks,
said virtual computer monitor makes said virtual computers, which are connected with the same said virtual network, communicate with each other with reference to said virtual configuration table, and wherein
said setting unit acquires connection setting information including an instruction for connecting or disconnecting a selected computer and a selected network to each other, said selected computer being one of said computer identified by one of said plurality of system resource identifiers displayed at a position corresponding to said operation position, said selected network being one of said networks identified by one of said one or more network identifiers displayed at a position corresponding to said operation position, and sets said state of connection between said selected computer and said selected network on the basis of said connection setting information, and wherein said setting unit, a) if said setting information includes said instruction for connection, writes information on connection between said selected computer and said selected network in said virtual configuration table, b) if said setting information includes said instruction for disconnection, erases information on connection between said selected computer and said selected network from said virtual configuration table, and c) when said network adding icon is handled, registers a new virtual network in said virtual configuration table.

11. A method of displaying information corresponding to a system on a screen of a display device, aid system including a plurality of system resources and one or more networks connecting said system resources, the method comprising:
displaying a plurality of system resource identifiers which identify said plurality of system resources respectively and one or more network identifiers which identify said one or more networks respectively;
displaying a state of connection between one of said system resources and one of said one or more networks at a position which is determined on the basis of a position at which the system resource identifier corresponding to the one of said system resources is displayed and a position at which the network identifier corresponding to the one of said one or more networks is displayed;
receiving an input to designate a connection between one of said plurality of said system resources and one of said one or more networks in said system at an operation position on said screen, said operation position corresponding to the position which said state of connection is displayed; and
setting connection between one of said plurality of system resources identified by one of said plurality of system resource identifiers displayed at a position corresponding to said operation position and one of said one or more networks identified by one of said one or more network identifiers displayed at the position corresponding to said operation position.

12. The method according to claim 11, comprising:
displaying a two-dimensional matrix with said system resource identifiers, in either one of a row and a column of said matrix; and said network identifiers in the other of said row and said column, and wherein
said setting comprises setting the connection between one of said plurality of system resources identified by one of said plurality of system resource identifiers displayed at either one of a row and a column of said matrix corresponding to said operation position and one of said one or more networks identified by one of said one or more network identifiers displayed at the other of said row and said column corresponding to said operation position.

13. The method according to claim 12, comprising:
displaying furthermore a network adding icon on said screen of said display device; and
in response to detecting that said network adding icon is handled;
generating a new network,
adding either of a new column and a new raw, corresponding to said new network, to said matrix, and
displaying said matrix.

14. The method according to claim 12, comprising:
displaying furthermore a network adding icon on said screen of said display device; and in response to detecting that said network adding icon is handled;

acquiring one of said one or more network identifiers identifying a hidden network which is one of said one or more networks included in said system and not displayed on said screen, adding either of a new column and a new raw, which is corresponding to said hidden network to said matrix; and displaying said matrix.

15. The method according to claim 12, wherein at least one of said system resources is a virtual computer, the method further comprising:

displaying furthermore a computer adding icon on said screen of said display device, and in response to detecting that said computer adding icon is handled;

generating a new virtual computer, adding either of a new row and a new column, which is corresponding to said new virtual computer, to said matrix; and displaying said matrix.

16. The management method according to claim 12, wherein at least one of said system resources is a computer which is either of a real computer and a virtual computer, the method further comprising:

displaying furthermore a computer adding icon on said screen of said display device;

in response detecting that said computer adding icon is handled;

acquiring one of said system resource identifiers identifying a hidden computer, which is said computer included in said system and not displayed on said screen, adding either of a new row and a new column, which is corresponding to said new computer not displayed on said screen, to said matrix; and displaying said matrix.

17. The method according to claim 12, comprising:

acquiring information regarding connection among said networks and system resources, selecting two system resources, a first system resource and a second system resource, which are not connected to same one of said networks, and arranging said network identifiers, along a first axis of a two-dimensional coordinate system defined on said screen, and said system resource identifiers, along a second axis of said two-dimensional coordinate system, while placing said system resource identifiers of said first system resource and said second system resource at the same row or column on said second axis.

18. The method according to claim 13, wherein at least one of said system resources is a computer which is either of a real computer and a virtual computer, at least one of said networks is a VLAN, said system includes one or more than one switches each of which has a plurality of ports and realizes said VLAN connecting designated said ports each other, each of said plural computers is connected with any one of said ports, and said method further comprises:

acquiring connection setting information including an instruction for connecting or disconnecting a selected computer and a selected network to each other, said selected computer being one of said computer identified by one of said plurality of system resource identifiers displayed at a position corresponding to said operation position, and said selected network being one of said networks identified by one of said one or more network identifiers displayed at a position corresponding to said operation position;

setting said state of connection between said selected system resource computer and said selected network on the basis of said connection setting information;

issuing an instruction to said switch to make said port, with which said selected computer is connected, included in said VLAN, which is said selected network, if said connection setting information includes said instruction for connection;

issuing an instruction to said switch to make said port, with which said selected computer is connected, erased from said VLAN, which is said selected network, if said connection setting information includes said instruction for disconnection; and generating new definition information on said VLAN when said network adding icon is handled, and outputting said new definition information to said switch.

19. The method according to claim 13, wherein at least one of said system resources is a computer which is either of a real computer and a virtual computer, said system includes one or more than one open flow switches each of which realizes at least one of said networks, and each of said plural computers is connected with any one of said open flow switches, and said method further comprises:

storing an OF control table indicating connection between said computers and said networks;

sending flow table information to said open flow switches so as to enable communication between said computers which are connected with the same said network respectively on said OF control table;

acquiring connection setting information including an instruction for connecting or disconnecting a selected computer and a selected network to each other, said selected computer being one of said computer identified by one of said plurality of system resource identifiers displayed at a position corresponding to said operation position, and said selected network being one of said networks identified by one of said one or more network identifiers displayed at a position corresponding to said operation position;

setting said state of connection between said selected computer and said selected network on the basis of said connection setting information;

adding connection between said selected computer and said selected networks to said OF control table if said setting information includes said instruction for connection;

erasing connecting between said selected computer and said selected network from said OF control table if said setting information includes said instruction for disconnection; and registering said new network in said OF control table when said network adding icon is handled.

20. The method according to claim 13, wherein said system resources are virtual computers realized by a virtual computer monitor running on said apparatus, and said networks are virtual networks realized by said virtual computer monitor, and said method further comprises:

storing a virtual configuration table indicating connection between said virtual computers and said virtual networks, carrying out communication between said virtual computers, which are connected with the same said virtual network respectively, with reference to said virtual configuration table;

acquiring connection setting information including an instruction for connecting or disconnecting a selected computer and a selected network to each other, said selected computer being one of said computer identified by one of said plurality of system resource identifiers displayed at a position corresponding to said operation position, and said selected network being one of said networks identified by one of said one or more network identifiers displayed at a position corresponding to said operation position;

setting said state of connection between said selected computer and said selected network on the basis of said connection setting information;

writing information on connection between said selected computer and said selected network in said virtual configuration table if said setting information includes said instruction for connection;

erasing information on connection between said selected computer and said selected network from said virtual configuration table if said setting information includes said instruction for disconnection; and registering said new virtual network in said virtual configuration table when said network adding icon is handled.

21. A computer readable non-transitory storage apparatus storing a program making a computer carry out a process of displaying information corresponding to a system on a screen of a display device, aid system including a plurality of system resources and one or more networks connecting said system resources, wherein said program makes said computer carry out a process of:

displaying a plurality of system resource identifiers which identify said plurality of system resources respectively and one or more network identifiers which identify said one or more networks respectively;

displaying a state of connection between one of said system resources and one of said one or more networks at a position which is determined on the basis of a position at which the system resource identifier corresponding to the one of said system resources is displayed and a position at which the network identifier corresponding to the one of said one or more networks is displayed;

receiving an input to designate a connection between one of said plurality of said system resources and one of said one or more networks in said system at an operation position on said screen, said operation position corresponding to the position which said state of connection is displayed; and setting connection between one of said plurality of system resources identified by one of said plurality of system resource identifiers displayed at a position corresponding to said operation position and one of said one or more networks identified by one of said one or more network identifiers displayed at the position corresponding to said operation position.

22. The computer readable non-transitory medium according to claim 21, wherein said program makes said computer carry out a process of:

displaying a two-dimensional matrix with said system resource identifiers, in either one of a row and a column of said matrix; and said network identifiers in the other of said row and said column, and wherein said setting comprises setting the connection between one of said plurality of system resources identified by one of said plurality of system resource identifiers displayed at either one of a row and a column of said matrix corresponding to said operation position and one of said one or more networks identified by one of said one or more network identifiers displayed at the other of said row and said column corresponding to said operation position.

23. The computer readable non-transitory medium according to claim 22 wherein said program makes said computer carry out a process of:

displaying furthermore a network adding icon on said screen of said display device; and in response to detecting that said network adding icon is handled;

generating a new network, adding either of a new column and a new raw, corresponding to said new network, to said matrix, and displaying said matrix.

24. The computer readable non-transitory medium according to claim 22 wherein said program makes said computer carry out a process of:

displaying furthermore a network adding icon on said screen of said display device; and in response to detecting that said network adding icon is handled;

acquiring one of said one or more network identifiers identifying a hidden network which is one of said one or more networks included in said system and not displayed on said screen, adding either of a new column and a new raw, which is corresponding to said hidden network to said matrix; and displaying said matrix.

25. The computer readable non-transitory medium according to claim 22 wherein at least one of said system resources is a virtual computer, and said program makes said computer carry out a process of:

displaying furthermore a computer adding icon on said screen of said display device, and in response to detecting that said computer adding icon is handled;

generating a new virtual computer, adding either of a new row and a new column, which is corresponding to said new virtual computer, to said matrix; and displaying said matrix.

26. The computer readable non-transitory medium according to claim 22, wherein at least one of said system resources is a computer which is either of a real computer and a virtual computer, and said program makes said computer carry out a process of:

displaying furthermore a computer adding icon on said screen of said display device;

in response detecting that said computer adding icon is handled;

acquiring one of said system resource identifiers identifying a hidden computer, which is said computer included in said system and not displayed on said screen, adding either of a new row and a new column, which is corresponding to said new computer not displayed on said screen, to said matrix; and displaying said matrix.

27. The computer readable non-transitory medium according to claim 22, wherein said program makes said computer carry out a process of:
  acquiring information regarding connection among said networks and system resources,
  selecting two system resources, a first system resource and a second system resource, which are not connected to same one of said networks, and
  arranging said network identifiers, along a first axis of a two-dimensional coordinate system defined on said screen, and said system resource identifiers, along a second axis of said two-dimensional coordinate system, while placing said system resource identifiers of said first system resource and said second system resource at the same row or column on said second axis.

28. The computer readable non-transitory medium according to claim 23 wherein
  at least one of said system resources is a computer which is either of a real computer and a virtual computer, at least one of said networks is a VLAN, said system includes one or more than one switches each of which has a plurality of ports and realizes said VLAN connecting designated said ports each other, each of said plural computers is connected with any one of said ports, said program makes said computer carry out a process of:
  acquiring connection setting information including an instruction for connecting or disconnecting a selected computer and a selected network to each other, said selected computer being one of said computer identified by one of said plurality of system resource identifiers displayed at a position corresponding to said operation position, and said selected network being one of said networks identified by one of said one or more network identifiers displayed at a position corresponding to said operation position;
  setting said state of connection between said selected system resource and said selected network on the basis of said connection setting information;
  issuing an instruction to said switch to make said port, with which said selected computer is connected, included in said VLAN, which is said selected network, if said connection setting information includes said instruction for connection;
  issuing an instruction to said switch to make said port, with which said selected computer is connected, erased from said VLAN, which is said selected network, if said connection setting information includes said instruction for disconnection; and
  generating new definition information on said VLAN when said network adding icon is handled, and outputting said new definition information to said switch.

29. The computer readable non-transitory medium according to claim 23 wherein
  at least one of said system resources is a computer which is either of a real computer and a virtual computer, said system includes one or more than one open flow switches each of which realizes at least one of said networks, and each of said plural computers is connected with any one of said open flow switches, and said program makes said computer carry out a process of:
  storing an OF control table indicating connection between said computers and said networks;
  sending flow table information to said open flow switch so as to enable communication between said computers which are connected with the same said network respectively on said OF control table;
  acquiring connection setting information including an instruction for connecting or disconnecting a selected computer and a selected network to each other, said selected computer being one of said computer identified by one of said plurality of system resource identifiers displayed at a position corresponding to said operation position, and said selected network being one of said networks identified by one of said one or more network identifiers displayed at a position corresponding to said operation position;
  setting said state of connection between said selected system resource and said selected network on the basis of said connection setting information;
  adding connection between said selected computer and said selected network to said OF control table if said setting information includes said instruction for connection;
  erasing connection between said selected computer and said selected network from said OF control table if said setting information includes said instruction for disconnection; and
  registering said new network in said OF control table when said network adding icon is handled.

30. The computer readable non-transitory medium according to claim 23 wherein
  said system resources are virtual computers realized by a virtual computer monitor running on said apparatus, and said networks are virtual networks realized by said virtual computer monitor, and said program makes said computer carry out a process of:
  storing a virtual configuration table indicating connection between said virtual computers and said virtual networks;
  carrying out communication between said virtual computers, which are connected with the same said virtual network respectively, with reference to said virtual configuration table;
  acquiring connection setting information including an instruction for connecting or disconnecting a selected computer and a selected network to each other, said selected computer being one of said computer identified by one of said plurality of system resource identifiers displayed at a position corresponding to said operation position, and said selected network being one of said networks identified by one of said one or more network identifiers displayed at a position corresponding to said operation position,
  setting said state of connection between said selected computer and said selected network on the basis of said connection setting information;
  writing information on connection between said selected computer and said selected network in said virtual configuration table if said setting information includes said instruction for connection;
  erasing information on connection between said selected computer and said selected network from said virtual configuration table if said setting information includes said instruction for disconnection; and
  registering said new virtual network in said virtual configuration table when said network adding icon is handled.

31. An apparatus, comprising:
  means for displaying information corresponding to a system on a screen of a display device, said system including a plurality of system resources and one or more networks connecting said system resources, wherein said display means is for displaying a plurality of system resource identifiers which identify said plurality of system resources respectively and one or more network identifiers which identify said one or more networks respectively, and is for displaying a state of connection between one of said system resources and one of said one or more networks at a position which is determined on the basis of a position at which the system resource identifier corresponding to the one of said system resources is displayed and a position at which the network identifier corresponding to the one of said one or more networks is displayed, and wherein said display means is for receiving an input to designate a connection between one of said plurality of said system resources and one of said one or more networks in said system at an operation position on said screen, said operation position corresponding to the position which said state of connection is displayed; and means for setting connection between one of said plurality of system resources identified by one of said plurality of system resource identifiers displayed at a position corresponding to said operation position and one of said one or more networks identified by one of said one or more network identifiers displayed at the position corresponding to said operation position.

32. The apparatus according to claim 1, wherein said position which the state of connection is displayed is different from both the position of the system resource identifier corresponding to the one of said system resources and the position of the network identifier corresponding to the one of said one or more networks.

33. The apparatus according to claim 1, wherein said state of connection identifies whether or not the one of said system resources is connected with the one of said one or more networks, said operation position corresponding to a position specifying a state in which the associated one of the system resources and the associated one of the network resources are not connected to each other.

* * * * *